(12) United States Patent
Mazanec et al.

(10) Patent No.: US 10,173,207 B2
(45) Date of Patent: Jan. 8, 2019

(54) REGENERATION OF CATALYTIC FAST PYROLYSIS CATALYST

(71) Applicant: Anellotech, Inc., Pearl River, NY (US)

(72) Inventors: Terry J. Mazanec, Solon, OH (US); Jeffrey P. Whiting, Goshen, VT (US); Fred Pesa, Auroroa, OH (US); Yu-Ting Cheng, Amherst, MA (US); Ruozhi Song, Wilmington, DE (US)

(73) Assignee: Anellotech, Inc., Pearl River, NY (US)

( * ) Notice: Subject to any disclaimer, the term of this patent is extended or adjusted under 35 U.S.C. 154(b) by 591 days.

(21) Appl. No.: 14/207,474

(22) Filed: Mar. 12, 2014

(65) Prior Publication Data

US 2014/0303414 A1 Oct. 9, 2014

Related U.S. Application Data

(60) Provisional application No. 61/776,797, filed on Mar. 12, 2013.

(51) Int. Cl.

| | |
|---|---|
| *B01J 29/90* | (2006.01) |
| *B01J 29/40* | (2006.01) |
| *B01J 38/12* | (2006.01) |
| *B01J 38/16* | (2006.01) |
| *B01J 38/26* | (2006.01) |
| *B01J 38/32* | (2006.01) |
| *B01J 38/38* | (2006.01) |

(Continued)

(52) U.S. Cl.
CPC ............ *B01J 29/90* (2013.01); *B01J 29/405* (2013.01); *B01J 38/12* (2013.01); *B01J 38/16* (2013.01); *B01J 38/26* (2013.01); *B01J 38/32* (2013.01); *B01J 38/38* (2013.01); *B01J 38/48* (2013.01); *B01J 38/50* (2013.01); *B01J 38/60* (2013.01); *B01J 38/62* (2013.01); *B01J 38/66* (2013.01); *C10B 53/02* (2013.01); *C10B 57/06* (2013.01); *Y02E 50/14* (2013.01); *Y02E 50/32* (2013.01); *Y02P 20/145* (2015.11)

(58) Field of Classification Search
CPC ........... B01J 38/48; B01J 38/16; C10B 53/02; C10B 57/06
USPC .................. 585/240; 502/22, 25, 27, 29
See application file for complete search history.

(56) References Cited

U.S. PATENT DOCUMENTS 3,133,049 A * 5/1964 Hertel .................. C07D 249/06
534/559
3,533,959 A 10/1970 Miale et al.
(Continued)

FOREIGN PATENT DOCUMENTS

| CN | 1608972 A | 4/2005 |
|---|---|---|
| CN | 1762601 A | 4/2006 |
| WO | 2011-031320 | 3/2011 |

OTHER PUBLICATIONS

Jae, J. "Production of Green Aromatics and Olefins from Lignocellulosic Biomass by Catalytic Fast Pyrolysis: Chemistry, Catalysis, and Process Development". Ph.D. Dissertation, University of Massachusetts, Amherst, MA. (2012), pp. 1-183.*

(Continued)

*Primary Examiner* — Philip Y Louie
*Assistant Examiner* — Aaron W Pierpont
(74) *Attorney, Agent, or Firm* — Frank Rosenberg

(57) ABSTRACT

A catalyst that is used in the catalytic pyrolysis of biomass is regenerated by oxidation and washing with a liquid to remove minerals and restore catalyst activity and selectivity to aromatics.

20 Claims, 8 Drawing Sheets

(51) Int. Cl.
B01J 38/48 (2006.01)
B01J 38/50 (2006.01)
B01J 38/60 (2006.01)
B01J 38/62 (2006.01)
B01J 38/66 (2006.01)
C10B 53/02 (2006.01)
C10B 57/06 (2006.01)

(56) References Cited

U.S. PATENT DOCUMENTS

| | | | | |
|---|---|---|---|---|
| 3,553,959 | A * | 1/1971 | Miale | G04F 1/08 368/93 |
| 4,043,938 | A | 8/1977 | Reif et al. | |
| 4,606,811 | A * | 8/1986 | Hettinger | C10G 11/18 208/108 |
| 4,935,121 | A | 6/1990 | Fu et al. | |
| 4,943,545 | A * | 7/1990 | Chang | B01J 29/084 208/120.15 |
| 5,019,241 | A | 5/1991 | Forester | |
| 5,139,649 | A | 8/1992 | Owen et al. | |
| 5,191,391 | A | 3/1993 | Tsai | |
| 5,212,127 | A | 5/1993 | Kocal | |
| 6,111,141 | A * | 8/2000 | Eller | C07C 209/26 564/473 |
| 6,395,664 | B1 | 5/2002 | Boehner | |
| 6,615,751 | B1 * | 9/2003 | Sørensen | C05B 1/00 110/342 |
| 8,277,643 | B2 | 10/2012 | Huber et al. | |
| 8,772,191 | B2 | 7/2014 | Kerleau et al. | |
| 2002/0120169 | A1 * | 8/2002 | Spagnol | B01J 29/90 568/316 |
| 2008/0318763 | A1 * | 12/2008 | Anderson | C11C 3/00 502/33 |
| 2009/0227823 | A1 * | 9/2009 | Huber | C10G 1/002 585/324 |
| 2012/0260563 | A1 * | 10/2012 | Marker | B01J 8/1809 44/307 |
| 2013/0060070 | A1 | 3/2013 | Huber et al. | |

OTHER PUBLICATIONS

Ancheyta, J.; Trejo, F.; Rana, M.S. "Asphaltenes: Chemical Transformation during Hydroprocessing of Heavy Oils", CRC Press: Boca Raton, FL, 2009; p. 244.*

International Search Report from International Application No. PCT/US2014/024855 issued by the International Searching Authority dated Aug. 5, 2014.
Written Opinion of the International Searching Authority from International Application No. PCT/US2014/024855 dated Aug. 5, 2014.
International Preliminary Examination Report on Patentability, issued for International Application No. PCT/US2014/024855 dated Sep. 15, 2015.
Dickerson, Theodore, et al., "Catalytic Fast Pyrolysis: a review", Energies 2013, 6, 514-538; doi: 10.3390/en6010514.
Huber, G.W., et al., "Synthesis of Transportation Fuels from Biomass: Chemistry, Catalysts, and Engineering," Chem. Rev. 106 (2006), pp. 4044-4098.
Taarning, Esben et al., "Zeolite-catalyzed biomass conversion to fuels and chemicals", Energy Environment Science, 2011,4,793-804.
Correspondence from the International Searching Authority from International Application No. PCT/US2014/024855 dated Aug. 13, 2014.
Torren, R. Carlson et al., "Production of green aromatics and olefins by catalytic fast pyrolysis process of wood sawdust", Energy & Environmental Science, vol. 4, No. 1, Jan. 1, 2011 (Jan. 1, 2011), p. 145 DOI: 10.1039/C0EE00341G.
Jong, Sung-Jeng et al, "On the Regeneration of Coked H-ZSM-5 Catalysts", Journal of Catalysis 174, 210-218 (1998), Article No. CA981971.
Zhang, Zingchang, et al., "Study of the deactivation and regeneration of the ZSM-5 catalyst used in methanol to olefins", Journal of Natural Gas Chemistry, 20 (2011)266-270.
Official Action from Chinese Patent Application No. 201480014853.9 dated Dec. 5, 2016.
Machine transation of Chinese Patent CN1762601A published Apr. 26, 2006.
Machine translation of CN1608972A.
Notice on Second Office Action issued in CN201480014853.9 dated Sep. 14, 2017.
Zhang, Li et al, "Regeneration and Recovery of SCR Catalyst De-NOx", Power Station Auxiliary Equipment, vol. 33, No. 3, Sep. 2012, pp. 27-52.

* cited by examiner

REGENERATION OF CATALYTIC FAST PYROLYSIS CATALYST

RELATED APPLICATIONS

This application claims the benefit of the priority of U.S. Provisional Patent Application Ser. No. 61/776,797, filed 12 Mar. 2013.

FIELD OF THE INVENTION

This invention relates to methods and apparatus for the regeneration of catalysts used in catalytic pyrolysis of biomass.

INTRODUCTION

Biomass upgrading by catalytic fast pyrolysis (CFP™) requires the conversion of a variety of polymer materials such as lignin, cellulose, and hemi-cellulose, in the presence of a catalyst, usually an acidic, micro-porous catalyst, usually a zeolite. The zeolite is active for the upgrading of the primary pyrolysis products of biomass decomposition, and converts them to aromatics, olefins, CO/CO2, char, coke and other useful materials.

Conventional means of regenerating catalyst from the catalytic pyrolysis of biomass involve the combustion of carbonaceous materials that remain on the surface or in the pores of the catalyst, so that the catalyst can be returned to the biomass pyrolysis reactor.

Regeneration of catalysts that have been used to catalyze the pyrolysis of biomass presents new challenges due to the unique compositions and conditions that are utilized in catalytic pyrolysis of biomass. Scientists and engineers working in other fields of catalysis have experimented with a wide variety of conditions to regenerate catalysts. For example, in U.S Pat. Nos. 5,212,127 and 6,395,664, Kocal et al. and Boehner et al. reported that zeolite catalysts used in catalytic dehydrocyclodimerization could be treated by removal from the operating reactor and contacting with an aqueous solution of a weak acid. Reif et al. in U.S. Pat. No. 4,043,938 reported on the reactivation of zeolite of type 5A which has been used to separate normal paraffins from hydrocarbon mixtures by alternating adsorption and desorption, the desorption being effected with water-contaminated ammonia vapor. Reif et al. reported that these catalysts could be reactivated by treatment with an aqueous solution comprising at least one bivalent metal salt. Miale et al. in U.S. Pat. No. 3,533,959 disclosed that spent aluminosilicate catalyst that had been damaged by exposure to heat or steam could be reactivated by contacting the spent catalyst with an aqueous solution comprising an agent capable of chelating aluminum at a pH between about 7 and 9. Fu et al., in U.S. Pat. No. 4,935,121 describe a process for regenerating a spent FCC catalyst containing contaminant metal(s) by contacting it with a fluorine-containing compound and an alkaline earth metal or antimony ion. Fu et al. in U.S. 5,191,391 describe the reactivation of a spent FCC catalyst by contacting the spent catalyst with nitric, sulfuric, or hydrochloric acid solution and then contacting it with an antimony compound. None of these references describe a solution for the problems caused by the pyrolysis of biomass on catalysts used in catalytic fast pyrolysis of biomass.

During the pyrolysis the catalyst becomes coked, i.e., carbon deposits form on the catalyst and in some of its pores. During the pyrolysis the catalyst also becomes mixed with the ash, minerals in the biomass that do not pyrolyze, and some of these minerals deposit on the catalyst, potentially blocking active sites or filling pores, and reducing catalyst activity and selectivity for aromatics production. Improved processes for recovering catalyst activity by decoking and removing ash minerals from the catalyst are needed.

SUMMARY OF THE INVENTION

In a first aspect, this invention provides a method for regenerating a catalyst used in catalytic pyrolysis of biomass, comprising: providing catalyst that has been used to catalyze the pyrolysis of biomass; washing the catalyst with a liquid; separating the catalyst from the liquid; and using at least a portion of the separated catalyst in a reactor for the catalytic pyrolysis of biomass.

In preferred embodiments, the liquid used to wash the catalyst is water, acidic water, basic water, water with surfactants, water with multi-dentate ligands such as EDTA, polyvinylalcohol, oxalic acid, alcohols, ethers, organic acids, amines, ammonium salts including ammonium nitrate, ammonium acetate, ammonium citrate, ammonium phosphate, or supercritical $CO_2$. As is the case with any of the listed options described herein, the invention is intended to include combinations of the listed elements; furthermore, the invention can be described in any desired subset of selected elements. For example, the liquid could be just supercritical $CO_2$; or, alternatively, just water or water with any additive that is mentioned herein. In some preferred embodiments, the liquid comprises at least 90%, at least 95%, or at least 99% water. In some preferred embodiments, the catalyst is washed in a Soxhlet extractor, or similar apparatus. Water and aqueous solutions are especially preferred due to their low cost, low toxicity, and high effectiveness. The washing process is preferably operated at any temperature from −20° C. to ~200° C., depending on the nature of the minerals to be removed, the solvent and the catalyst. In some embodiments the chamber in which catalyst and water are mixed is fitted with a cooling mechanism to prevent undesirable high temperatures. In some embodiments the temperature is maintained below 200° C., or below 150° C., or below 100° C., or below 50° C., or at 15 to 100° C., or at 20 to 50° C. The washing could be done under pressure; however, conditions that damage the catalyst should be avoided. The washing step can be a continuous process or can be accomplished in batches. In some embodiments the minerals extracted into the liquid phase are recovered. In some embodiments the used washing liquid is treated to remove at least a portion of the materials washed from the catalyst and the liquid is recycled to the washing step.

Due to the liquid wash, the separated catalyst will typically have a lower percentage of one or more of the following elements K, Ca, Na, Mg, Fe, Mn, S, or combinations thereof; preferably at least 10%, 20%, 50%, 80% less (or between 10 and 95% less, 10 and 90%, 10 and 80%, 10 and 50% less) of at least one of the elements selected from the group consisting of K, Ca, Na, Mg, Fe, Mn, S, or combinations thereof, than does the catalyst prior to the washing step. In these comparisons, the weight (mass) does not include the weight of liquid. In particular, in the case of K (a common component of biomass), the separated catalyst has a lower percentage of potassium; preferably at least 10%, 20%, 50%, 80% less potassium, than does the catalyst prior to the washing step. These diminished percentages are preferably after a step of oxidizing the catalyst (typically done to remove carbon); for example, catalyst that is removed from a biomass pyrolysis reactor and subjected to an oxidation step may have 0.10 mass % K and after the washing step would have 20% less K (0.08% K).

The catalyst may be characterized by a concentration of Brønsted acid sites. In some embodiments, the washed and separated catalyst can have at least 79% (in some embodiments, 174% or less) of the number of Brønsted acid sites as compared to a freshly prepared catalyst. Unless described otherwise, Brønsted acid sites are determined by deconvoluting the IPA-TPD trace as shown in the examples. The term "a freshly prepared catalyst" refers to the catalyst that has not been regenerated and is in the state that it is added to a biomass pyrolysis reactor.

The separated catalyst may have a lower percentage of carbon than does the catalyst exiting the catalytic fast pyrolysis reactor. The washed catalyst can be separated from the liquid by a process comprising one or more filtration steps. Typically, the process includes a step of reacting the catalyst that has been used to catalyze the pyrolysis of biomass with an oxidant; and, preferably, a step of reacting with an oxidant is conducted prior to the step of washing. The step of reacting with an oxidant is preferably conducted at a temperature of at least 550° C. but less than 690° C. Typically, the catalyst that is contacted with the oxidant contains at least about 0.1%, at least about 0.2%, at least about 0.5%, at least about 1.0%, or at least about 1.5% by weight carbon, based on the total weight of catalyst including any contaminants. In addition, or alternatively, the step of reacting with an oxidant can be conducted after the step of washing. In some embodiments, at least a portion of the catalyst that has been treated with an oxidant is passed through one or more cyclones to separate the catalyst from ash. In some preferred embodiments, at least a portion of hot flue gas from the combustion (oxidation) chamber is used to heat a catalytic pyrolysis reactor.

In some preferred embodiments, the process may comprise a step subsequent to the step of washing wherein the catalyst activity is increased by treating the catalyst with a solution that adds a metal or metals to the catalyst. Preferred metals include Fe, Ga, Zn, and La. In some preferred embodiments, prior to the step of washing the catalyst, the catalyst that was used to catalyze the pyrolysis of biomass is exposed to a gas stream comprising steam. In some preferred embodiments, prior to the step of washing the catalyst, the catalyst that was used to catalyze the pyrolysis of biomass is combusted with oxygen in the presence of steam. In some preferred embodiments, the step of reacting with an oxidant is conducted in a combustion zone wherein the coke contaminated catalyst enters the combustion zone subsequently exits the combustion zone at a location that is lower with respect to gravity; and wherein oxygen containing regeneration gas enters from below the combustion zone and exits above the combustion zone. In some preferred embodiments, at least a portion of the oxygen containing gas that exits from the combustion zone is recycled back into the combustion zone. In some preferred embodiments, at least a portion of the hot flue gas from the combustion zone is used to heat a catalytic pyrolysis reactor. The step of reacting with an oxidant results in a hot regenerated catalyst that is preferably separated from ash before being subjected to the washing step.

Typically, the catalytic pyrolysis of biomass results in coke-contaminated catalyst which is washed with the liquid; the catalyst is separated from the liquid and at least a portion of the separated catalyst is then again added to the reactor for the catalytic pyrolysis of biomass. In some preferred embodiments, the carbon content of the coke-contaminated catalyst has been reduced to less than 1.8%, or less than 1.0%, or less than 0.6%, or less than 0.3% or less than 0.2%, or less than 0.1%, or less than 5000 ppm, or less than 1000 ppm, or less than 250 ppm. In some preferred embodiments, the carbon content of the coke-contaminated catalyst remains greater than 1.0%, or greater than 0.6%, or greater than 0.3% or greater than 0.2%, or greater than 0.1%, or greater than 5000 ppm, or greater than 1000 ppm, or greater than 250 ppm. Preferably, the K, Ca, Mg, Fe, and/or S content of the coke-contaminated catalyst remains greater than 1.0%, or greater than 0.6%, or greater than 0.3% or greater than 0.2%, or greater than 0.1%, or greater than 5000 ppm, or greater than 1000 ppm, or greater than 250 ppm.

The invention includes a process for regenerating a catalyst by introducing an oxygen-containing regeneration gas and coke contaminated fluid catalyst into a lower point of a dilute phase combustion zone maintained at a temperature sufficient for coke oxidation and therein oxidizing coke to produce hot regenerated catalyst and hot flue gas; transporting said hot flue gas and said hot regenerated catalyst from an upper point of said combustion zone into a regenerated catalyst disengaging zone, wherein said hot regenerated catalyst is separated from said flue gas; and transporting a portion of said hot regenerated catalyst from said disengaging zone to the catalyst feed hopper of a fluid bed catalytic fast pyrolysis reactor The invention also includes apparatus and systems (which include apparatus, chemical compositions and/or conditions within apparatus). In some preferred embodiments, the invention includes a mixture that comprises a least 1 g catalyst per liter of liquid.

The invention provides an apparatus for regenerating a coke-contaminated, fluid catalyst, which apparatus comprises: a combustion chamber having an inlet for coke-contaminated pyrolysis catalyst, an inlet for an oxygen-containing regeneration gas connecting with a lower portion of the combustion chamber, an outlet for flue gas, and an outlet for regenerated catalyst; a disengagement chamber having an inlet that is connected to the outlet of the combustion chamber; a heat exchange conduit containing heat absorbing material positioned within the combustion chamber adapted to remove heat from the combustion chamber, the conduits being sealed with respect to the interior of the combustion chamber such that the heat-absorbing material is in indirect heat exchanging contact with the interior of the combustion chamber; and a washing chamber adapted to receive the regenerated catalyst.

The washing chamber comprises a tank or vessel having an inlet for the solids and an inlet for the wash solution, wherein the solids and wash solution are contacted. The washing chamber can be operated in a batch or preferably in a continuous manner. When operated in a continuous manner the wash chamber contains apparatus for collecting the solids such as a filter or screen or mesh or sieve or other mechanism or structure known to those skilled in the art by which the solids are separated from the liquid and removed from the chamber, and an exit conduit for the spent wash solution.

In preferred embodiments, the invention provides systems or methods comprising the apparatus which maintains the time averaged maximum or transient maximum temperature in the combustion chamber at a temperature less than 750° C., or less than 725° C., or less than 700° C., or less than 690° C., or less than 660° C., or less than 650° C., or less than 625° C. Preferably, the combustion chamber comprises a fluidized bed reactor adapted so that the regeneration gas inlet provides at least a portion of the fluidization gas.

In preferred embodiments of the invention: the catalyst is in the form of particles; the pyrolysis of biomass is conducted in a fluidized bed reactor. Preferably, the catalyst comprises a zeolite. In some embodiments, the invention provides a catalyst for the catalytic fast pyrolysis of biomass wherein element or elements deposited on the catalyst during the pyrolysis reaction have been at partially, but not completely removed, for example, comprising deposited elements that comprise at least 1.8%, or 1.0%, or 0.6%, or 0.3% or 0.2%, or 0.1%, or 5000 ppm, or 1000 ppm, or 250 ppm or less of the total mass of catalyst plus contaminants. The invention includes intermediates such as the catalyst that has been washed with a liquid or in a liquid solution.

We have surprisingly found that catalyst can be successfully used for the catalytic pyrolysis of biomass where a significant percentage of contaminants remain on the catalyst. Thus, the invention includes processes, apparatus, systems and catalysts wherein the catalyst retains coke deposited on the catalyst during exposure to biomass and is not fully removed, i.e., the carbon content remaining on the catalyst is at least 1.8%, or 1.0%, or 0.6%, or 0.3% or 0.2%, or 0.1%, or 5000 ppm, or 1000 ppm, or 250 ppm.

The invention also includes recovery of minerals and mineral solutions. For example, the invention includes a solution obtained by the washing of a used calcined catalytic fast pyrolysis catalyst with water or other solvent comprising K, Ca, Mg, Si, Ga, Zn, Co, Fe, Cr, Cu, V, Ni, Mn, Ag, Na, P, Sn, Zr, Nb, Y, Ti, Ce, La, or combinations thereof; as well as minerals recovered from this solution. The invention includes a process for recovering minerals from the catalytic pyrolysis of biomass, comprising separating dissolved solids from any of the solutions.

This invention further provides a method for regenerating a coke contaminated catalytic fast pyrolysis catalyst by contacting the catalyst with an oxygen-containing gas in a fluidized bed or other regenerator, separating the regenerated catalyst from the flue gas, washing a portion of the separated catalyst, and returning the hot regenerated catalyst and washed catalyst to the catalyst feed hopper of the catalytic fast pyrolysis reactor. In the method for regenerating a coke and minerals contaminated catalytic fast pyrolysis catalyst, the process includes the steps of: (1) introducing oxygen-containing regeneration gas and coke-contaminated catalyst into a combustion zone maintained at a temperature sufficient for coke oxidation and therein oxidizing coke to produce hot regenerated catalyst and hot flue gas; (2) transporting at least a portion of the hot flue gas and at least a portion of the hot regenerated catalyst from the combustion zone into a regenerated catalyst disengaging zone, wherein the hot oxidatively regenerated catalyst is separated from the flue gas; (3) transporting a portion of the separated catalyst from the disengaging zone to a catalyst washing zone and contacting the catalyst with a wash solution, and (4) separating the washed catalyst from the wash solution and transporting it to a feed hopper of a fluid bed catalytic fast pyrolysis reactor.

In another embodiment the process includes the steps of (1) treating a partially deactivated catalyst with a steaming/stripping gas, (2) introducing oxygen-containing regeneration gas and the steamed/stripped coke-contaminated catalyst into a combustion zone maintained at a temperature sufficient for coke oxidation and therein oxidizing coke to produce hot regenerated catalyst and hot flue gas; (3) transporting at least a portion of the hot flue gas and at least a portion of the hot regenerated catalyst from the combustion zone into a regenerated catalyst disengaging zone, wherein the hot regenerated catalyst is separated from the flue gas; (4) transporting a portion of the separated catalyst from the disengaging zone to a catalyst washing zone and contacting the catalyst with a wash solution, and (5) separating the washed catalyst from the wash solution and transporting it to a catalyst feed hopper of a fluid bed catalytic fast pyrolysis reactor.

In any of the inventive embodiments, optionally, gas from the combustion chamber(s) can be used elsewhere in a biomass conversion process, preferably by heating a CFP biomass reactor or recycled into the combustion chamber. In some embodiments the catalyst regeneration process comprises more than one combustion chamber in series or in a single combustion chamber but at two different temperatures.

Glossary

Aromatics—As used herein, the terms "aromatics" or "aromatic compound" are used to refer to a hydrocarbon compound or compounds comprising one or more aromatic groups such as, for example, single aromatic ring systems (e.g., benzyl, phenyl, etc.) and fused polycyclic aromatic ring systems (e.g. naphthyl, 1,2,3,4-tetrahydronaphthyl, etc.). Examples of aromatic compounds include, but are not limited to, benzene, toluene, indane, indene, 2-ethyl toluene, 3-ethyl toluene, 4-ethyl toluene, trimethyl benzene (e.g., 1,3,5-trimethyl benzene, 1,2,4-trimethyl benzene, 1,2,3-trimethyl benzene, etc.), ethylbenzene, styrene, cumene, methylbenzene, propylbenzene, xylenes (e.g., p-xylene, m-xylene, o-xylene, etc.), naphthalene, methyl-naphthalene (e.g., 1-methyl naphthalene, anthracene, 9.10-dimethylanthracene, pyrene, phenanthrene, dimethyl-naphthalene (e.g., 1,5-dimethylnaphthalene, 1,6-dimethylnaphthalene, 2,5-dimethylnaphthalene, etc.), ethyl-naphthalene, hydrindene, methyl-hydrindene, and dymethyl-hydrindene. Single-ring and/or higher ring aromatics may also be produced in some embodiments.

Biomass—As used herein, the term "biomass" is given its conventional meaning in the art and is used to refer to any organic source of energy or chemicals that is renewable. Its 10 major components can be: (1) trees (wood) and all other vegetation; (2) agricultural products and wastes (corn, fruit, garbage ensilage, etc.); (3) algae and other marine plants; (4) metabolic wastes (manure, sewage), and (5) cellulosic urban waste. Examples of biomass materials are described, for example, in Huber, G. W. et al, "Synthesis of Transportation Fuels from Biomass: Chemistry, Catalysts, and Engineering," Chem. Rev. 106, (2006), pp. 4044-4098.

Biomass is conventionally defined as the living and recently dead biological material that can be converted for use as fuel or for industrial production. The criterion as biomass is that the material should be recently participating in the carbon cycle so that the release of carbon in the combustion process results in no net increase averaged over a reasonably short period of time (for this reason, fossil fuels such as peat, lignite and coal are not considered biomass by this definition as they contain carbon that has not participated in the carbon cycle for a long time so that their combustion results in a net increase in atmospheric carbon dioxide). Most commonly, biomass refers to plant matter grown for use as biofuel, but it also includes plant or animal matter used for production of fibers, chemicals or heat. Biomass may also include biodegradable wastes or byproducts that can be burnt as fuel or converted to chemicals, including municipal wastes, green waste (the biodegradable waste comprised of garden or park waste, such as grass or flower cuttings and hedge trimmings), byproducts of farming including animal manures, food processing wastes, sewage sludge, black liquor from wood pulp or algae.

Biomass excludes organic material which has been transformed by geological processes into substances such as coal, oil shale or petroleum.

Biomass is widely and typically grown from plants, including miscanthus, spurge, sunflower, switchgrass, hemp, corn (maize), poplar, willow, sugarcane, and oil palm (palm oil) with the roots, stems, leaves, seed husks and fruits all being potentially useful. The particular plant or other biomass source used is not important to the product chemical or fuel although the processing of the raw material for introduction to the processing unit will vary according to the needs of the unit and the form of the biomass.

Catalyst Residence Time—The catalyst residence time of the catalyst in the reactor is defined as the volume of the reactor filled with catalyst divided by the volumetric flow rate of the catalyst through the reactor. For example, if a 3-liter reactor contains 2 liters of catalyst and a flow of 0.4 liters per minute of catalyst is fed through the reactor, i.e., both fed and removed, the catalyst residence time is 2/0.4 minutes, or 5 minutes.

Contact Time—Contact time is the residence time of a material in a reactor or other device, when measured or calculated under standard conditions of temperature and pressure, i.e., 0° C. and 1 atm. For example, a 2-liter reactor to which is fed 3 standard liters per minute of gas has a contact time of 2/3 minute, or 40 seconds for that gas. For a chemical reaction, contact time or residence time is based on the volume of the reactor, where substantial reaction is occurring, and would exclude volume where substantially no reaction is occurring, such as an inlet or an exhaust conduit. For catalyzed reactions, the volume of a reaction chamber is the volume where catalyst is present.

Conversion—The term "conversion of a reactant" refers to the reactant mole or mass change between a material flowing into a reactor and a material flowing out of the reactor divided by the moles or mass of reactant in the material flowing into the reactor. For example, if 100 grams of ethylene are fed to a reactor and 30 grams of ethylene are flowing out of the reactor, the conversion is [(100−30)/100]= 70% conversion of ethylene.

Fluid—The term "fluid" refers to a gas, a liquid, a mixture of a gas and a liquid, or a gas or a liquid containing dispersed solids, liquid droplets and/or gaseous bubbles. The terms "gas" and "vapor" have the same meaning and are sometimes used interchangeably. In some embodiments, it may be advantageous to control the residence time of the fluidization fluid in the reactor. The fluidization residence time of the fluidization fluid is defined as the volume of the reactor divided by the volumetric flow rate of the fluidization fluid under process conditions of temperature and pressure.

Fluidized Bed Reactor—As used herein, the term "fluidized bed reactor" is given its conventional meaning in the art and is used to refer to reactors comprising a vessel that can contain a granular solid material (e.g., silica particles, catalyst particles, etc.), in which a fluid (e.g., a gas or a liquid) is passed through the granular solid material at velocities sufficiently high as to suspend the solid material and cause it to behave as though it were a fluid. The term "circulating fluidized bed reactor" is also given its conventional meaning in the art and is used to refer to fluidized bed reactors in which the granular solid material is passed out of the reactor, circulated through a line in fluid communication with the reactor, and recycled back into the reactor.

Bubbling fluidized bed reactors and turbulent fluidized bed reactors are also known to those skilled in the art. In bubbling fluidized bed reactors, the fluid stream used to fluidize the granular solid material is operated at a sufficiently low flow rate such that bubbles and voids are observed within the volume of the fluidized bed during operation. In turbulent fluidized bed reactors, the flow rate of the fluidizing stream is higher than that employed in a bubbling fluidized bed reactor, and hence, bubbles and voids are not observed within the volume of the fluidized bed during operation.

Examples of circulating fluidized bed reactors, bubbling fluidized bed reactors and turbulent fluidized bed reactors are described in Kirk-Othmer Encyclopedia of Chemical Technology (online), Vol. 11, Hoboken, N.J.: Wiley¬ Interscience, c2001, pages 791-825, incorporated herein by reference.

Liquids—For the purposes of the present invention, "liquids" are liquid phase materials. "Aqueous solutions" include liquid water and liquid water comprising one or more solutes.

Olefins—As used herein, the terms "olefin" or "olefin compound" (a.k.a. "alkenes") are given their ordinary meaning in the art, and are used to refer to any unsaturated hydrocarbon containing one or more pairs of carbon atoms linked by a double bond. Olefins include both cyclic and acyclic (aliphatic) olefins, in which the double bond is located between carbon atoms forming part of a cyclic (closed-ring) or of an open-chain grouping, respectively. In addition, olefins may include any suitable number of double bonds (e.g., monoolefins, diolefins, triolefins, etc.). Examples of olefin compounds include, but are not limited to, ethene, propene, allene (propadiene), 1-butene, 2-butene, isobutene (2 methyl propene), butadiene, and isoprene, among others. Examples of cyclic olefins include cyclopentene, cyclohexane, cycloheptene, among others. Aromatic compounds such as toluene are not considered olefins; however, olefins that include aromatic moieties are considered olefins, for example, benzyl acrylate or styrene.

Pore size—Pore size relates to the size of a molecule or atom that can penetrate into the pores of a material. As used herein, the term "pore size" for zeolites and similar catalyst compositions refers to the Norman radii adjusted pore size well known to those skilled in the art. Determination of Norman radii adjusted pore size is described, for example, in Cook, M.; Conner, W. C., "How big are the pores of zeolites?" Proceedings of the International Zeolite Conference, 12th, Baltimore, Jul. 5-10, 1998; (1999), 1, pp 409-414, which is incorporated herein by reference in its entirety. As a specific exemplary calculation, the atomic radii for ZSM-5 pores are about 5.5-5.6 Angstroms, as measured by x-ray diffraction. In order to adjust for the repulsive effects between the oxygen atoms in the catalyst, Cook and Conner have shown that the Norman adjusted radii are 0.7 Angstroms larger than the atomic radii (about 6.2-6.3 Angstroms).

One of ordinary skill in the art will understand how to determine the pore size (e.g., minimum pore size, average of minimum pore sizes) in a catalyst. For example, x-ray diffraction (XRD) can be used to determine atomic coordinates. XRD techniques for the determination of pore size are described, for example, in Pecharsky, V. K. et at, "Fundamentals of Powder Diffraction and Structural Characterization of Materials," Springer Science+Business Media, Inc., New York, 2005, incorporated herein by reference in its entirety. Other techniques that may be useful in determining pore sizes (e.g., zeolite pore sizes) include, for example, helium pycnometry or low-pressure argon adsorption techniques. These and other techniques are described in Magee, J. S. et at, "Fluid Catalytic Cracking: Science and Technology," Elsevier Publishing Company, Jul. 1, 1993, pp. 185-

195, which is incorporated herein by reference in its entirety. Pore sizes of mesoporous catalysts may be determined using, for example, nitrogen adsorption techniques, as described in Gregg, S. J. at al, "Adsorption, Surface Area and Porosity," 2nd Ed., Academic Press Inc., New York, 1982 and Rouquerol, F. et al, "Adsorption by powders and porous materials. Principles, Methodology and Applications," Academic Press Inc., New York, 1998, both incorporated herein by reference in their entirety.

In some embodiments, a screening method is used to select catalysts with appropriate pore sizes for the conversion of specific pyrolysis product molecules. The screening method may comprise determining the size of pyrolysis product molecules desired to be catalytically reacted (e.g., the molecule kinetic diameters of the pyrolysis product molecules). One of ordinary skill in the art can calculate, for example, the kinetic diameter of a given molecule. The type of catalyst may then be chosen such that the pores of the catalyst (e.g., Norman adjusted minimum radii) are sufficiently large to allow the pyrolysis product molecules to diffuse into and/or react with the catalyst. In some embodiments, the catalysts are chosen such that their pore sizes are sufficiently small to prevent entry and/or reaction of pyrolysis products whose reaction would be undesirable.

Catalysts—Catalyst components useful in the context of this invention can be selected from any catalyst known in the art, or as would be understood by those skilled in the art. Catalysts promote and/or effect reactions. Thus, as used herein, catalysts lower the activation energy (increase the rate) of a chemical process, and/or improve the distribution of products or intermediates in a chemical reaction (for example, a shape selective catalyst). Examples of reactions that can be catalyzed include: dehydration, dehydrogenation, isomerization, hydrogen transfer, aromatization, decarbonylation, decarboxylation, aldol condensation, and combinations thereof. Catalyst components can be considered acidic, neutral or basic, as would be understood by those skilled in the art.

For catalytic fast pyrolysis, particularly advantageous catalysts include those containing internal porosity selected according to pore size (e.g., mesoporous and pore sizes typically associated with zeolites), e.g., average pore sizes of less than about 100 Angstroms, less than about 50 Angstroms, less than about 20 Angstroms, less than about 10 Angstroms, less than about 5 Angstroms, or smaller. In some embodiments, catalysts with average pore sizes of from about 5 Angstroms to about 100 Angstroms may be used. In some embodiments, catalysts with average pore sizes of between about 5.5 Angstroms and about 6.5 Angstroms, or between about 5.9 Angstroms and about 6.3 Angstroms may be used. In some cases, catalysts with average pore sizes of between about 7 Angstroms and about 8 Angstroms, or between about 7.2 Angstroms and about 7.8 Angstroms may be used. In some preferred embodiments of CFP, the catalyst may be selected from naturally occurring zeolites, synthetic zeolites and combinations thereof. In certain embodiments, the catalyst may be a ZSM-5 zeolite catalyst, as would be understood by those skilled in the art. Optionally, such a catalyst can comprise acidic sites. Other types of zeolite catalysts include: ferrierite, zeolite Y, zeolite beta, mordenite, MCM-22, ZSM-23, ZSM-57, SUZ-4, EU-1, ZSM-11, (S)AlP0-31, SSZ-23, among others. In other embodiments, non-zeolite catalysts may be used; for example, WOx/ZrO2, aluminum phosphates, etc. In some embodiments, the catalyst may comprise a metal and/or a metal oxide. Suitable metals and/or oxides include, for example, nickel, palladium, platinum, titanium, vanadium chromium, manganese, iron, cobalt, zinc, copper, gallium, and/or any of their oxides, among others. In some cases promoter elements chosen from among the rare earth elements, i.e., elements 57-71, cerium, zirconium or their oxides for combinations of these may be included to modify activity or structure of the catalyst. In addition, in some cases, properties of the catalysts (e.g., pore structure, type and/or number of acid sites, etc.) may be chosen to selectively produce a desired product.

Pyrolysis—As used herein, the terms "pyrolysis" and "pyrolyzing" are given their conventional meaning in the art and are used to refer to the transformation of a compound, e.g., a solid hydrocarbonaceous material, into one or more other substances, e.g., volatile organic compounds, gases and coke, by heat, preferably without the addition of, or in the absence of, O2. Preferably, the volume fraction of O2 present in a pyrolysis reaction chamber is 0.5% or less. Pyrolysis may take place with or without the use of a catalyst. "Catalytic pyrolysis" refers to pyrolysis performed in the presence of a catalyst, and may involve steps as described in more detail below. Example of catalytic pyrolysis processes are outlined, for example, in Huber, G. W. et al, "Synthesis of Transportation Fuels from Biomass: Chemistry, Catalysts, and Engineering," Chem. Rev. 106, (2006), pp. 4044-4098.

Residence Time—Residence time is defined as the volume of the reactor or device, or specific portion of a device, divided by the exit flow of all gases out of the reactor, or device or portion of the reactor or device, including fluidization gas, products, and impurities, measured or calculated at the average temperature of the reactor or device and the exit pressure of the reactor or device or portion thereof.

Selectivity—The term "selectivity" refers to the amount of production of a particular product in comparison to a selection of products. Selectivity to a product may be calculated by dividing the amount of the particular product by the amount of a number of products produced. For example, if 75 grams of aromatics are produced in a reaction and 20 grams of benzene are found in these aromatics, the selectivity to benzene amongst aromatic products is 20/75=26.7%. Selectivity can be calculated on a mass basis, as in the aforementioned example, or it can be calculated on a carbon basis, where the selectivity is calculated by dividing the amount of carbon that is found in a particular product by the amount of carbon that is found in a selection of products. Unless specified otherwise, for reactions involving biomass as a reactant, selectivity is on a mass basis. For reactions involving conversion of a specific molecular reactant (ethene, for example), selectivity is the percentage (on a mass basis unless specified otherwise) of a selected product divided by all the products produced.

The weight hourly space velocity, WHSV, as used herein is defined as it is conventionally, as the feed rate of addition of a feed to a process divided by the mass of catalyst maintained within the reaction zone. WHSV normally has the units of inverse time, hr-1. For example, if biomass is fed with a feed rate of 10 kg/hour to a reactor that contains 5 kg of catalyst in the reactive zone, the WHSV is 10/5=2.0 hr-1.

The term "yield" is used herein to refer to the amount of a product flowing out of a reactor divided by the amount of reactant flowing into the reactor, usually expressed as a percentage or fraction. Yields are often calculated on a mass basis, carbon basis, or on the basis of a particular feed component. Mass yield is the mass of a particular product divided by the weight of feed used to prepare that product. For example, if 500 grams of biomass is fed to a reactor and 45 grams of benzene is produced, the mass yield of benzene would be 45/500=9% benzene. Carbon yield is the mass of carbon found in a particular product divided by the mass of carbon in the feed to the reactor. For example, if 500 grams of biomass that contains 40% carbon is reacted to produce 45 grams of benzene that contains 92.3% carbon, the carbon yield is [(45*0.923)/(500*0.40)]=20.8%. Carbon yield from biomass is the mass of carbon found in a particular product divided by the mass of carbon fed to the reactor in a particular feed component. For example, if 500 grams of biomass containing 40% carbon and 100 grams of CO2 are reacted to produce 40 g of benzene (containing 92.3% carbon), the carbon yield on biomass is [(40*0.923)/(500*0.40)]=18.5%; note that the mass of CO2 does not enter into the calculation.

As is standard patent terminology, the term "comprising" means "including" and does not exclude additional components. Any of the inventive aspects described in conjunction with the term "comprising" also include narrower embodiments in which the term "comprising" is replaced by the narrower terms "consisting essentially of" or "consisting of:" As used in this specification, the terms "includes" or "including" should not be read as limiting the invention but, rather, listing exemplary components. As is standard terminology, "systems" include to apparatus and materials (such as reactants and products) and conditions within the apparatus.

DETAILED DESCRIPTION

Figure 1:
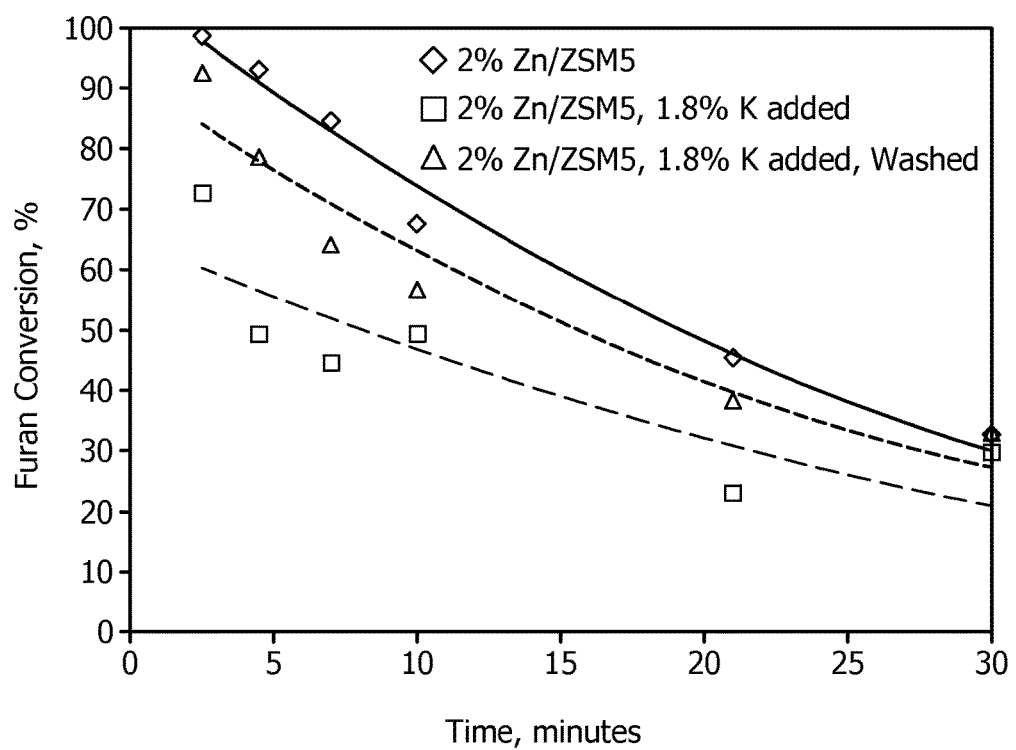
FIG. 1. Furan conversion vs time on stream during furan conversion at 550° C. for Catalyst A (2% Zn/ZSM-5), Catalyst B (2% Zn/ZSM-5, 1.8% K added) and Catalyst C (2% Zn/ZSM-5, 1.8% K added, Washed).

It is an object of the present invention to propose a process for regenerating the Catalytic Fast Pyrolysis (CFP™) catalyst by removing the carbon by partial combustion and, optionally, steaming or stripping, and removal of excess mineral materials by washing with water, dilute acid or base solutions, or solvent mixtures, and optionally re-introducing active metals into the catalyst.

In an optional first step of the catalyst regeneration the used catalyst that has been coked and has had minerals deposited on it is subjected to stripping/steaming before the oxidation step. In a stripping/steaming step, a flow of steam, inert gas, or recycle gas, or some combination of these is passed over or through the spent catalyst and then added to the product stream. In the oxidation step, the catalyst is exposed to an oxidizing gas, usually air or diluted air or a CO2 or steam containing stream, at a temperature sufficient to cause combustion of the coke. The catalyst can be heated slowly in the presence of the oxidation gas or the oxidizing gas can be introduced to the hot catalyst by slowly increasing its oxidative capacity by first diluting it with inert gases and slowly lowering the dilution, preferably at a constant temperature. Or a combination of temperature profile and oxidative gas concentration can be used. The oxidative catalyst regeneration can comprise more than one step of oxidation carried out in one or more than one reactors. If more than one oxidative regeneration steps is employed the second oxidative regeneration is conducted at a temperature higher than the first oxidative regeneration. In some cases, the catalyst exiting the CFP reaction product separator may be at least partially deactivated. The separated catalyst may be fed, in some embodiments, to an oxidative regenerator in which catalyst that was at least partially deactivated may be reactivated. In some embodiments, the oxidative regenerator may comprise an optional purge stream, which may be used to purge coke, ash, and/or catalyst from the oxidative regenerator. Methods for regenerating catalysts are well-known to those skilled in the art, for example, as described in Kirk-Othmer Encyclopedia of Chemical Technology (Online), Vol. 5, Hoboken, N.J.: Wiley-Interscience, 2001, pages 255-322.

In one set of embodiments, an oxidizing agent is fed to the oxidative regenerator via an inlet stream. The oxidizing agent may originate from any source including, for example, a tank of oxygen, atmospheric air, or steam, or a portion of the vent gas from the regenerator, among others. In the oxidative regenerator, the catalyst is re-activated by reacting the catalyst with the oxidizing agent. In some cases, the deactivated catalyst may comprise residual carbon and/or coke, which may be removed via reaction with the oxidizing agent in the oxidative regenerator. The oxidative regenerator comprises a vent stream which may include regeneration reaction products, residual oxidizing agent, and/or inert gases. The vent stream from the regenerator may be passed through a catalytic exhaust gas cleanup system to further reduce the concentrations of CO and hydrocarbons to reduce emissions vented to the atmosphere. Portions of the vent stream may be recycled to the gas feed of the regenerator to control the heat release of the regeneration process.

An important feature of the oxidative regeneration process is that it is not required to rigorously remove all of the coke on the catalyst since small amounts of coke may not significantly interfere with catalyst activity or selectivity. It also may be economically unattractive to remove the coke to such small quantities since the process would take longer and require longer catalyst residence time in the oxidative regenerator and larger volumes of regeneration gas etc. In some embodiments the coke remaining on the catalyst can be 1.8%, or 1.0%, or 0.6%, or 0.3% or 0.2%, or 0.1%, or 5000 ppm, or 1000 ppm, or 250 ppm or less, or from 0.1% to 1.8%, or from 0.2% to 1.0%, or from 0.3 to 1.0% (based on the mass of coke remaining divided by the mass of catalyst plus coke; where the mass of coke remaining can be measured by elemental analysis or by completely burning off the coke; and where initial mass is measured after any degassing steps but before the oxidative regeneration process). The oxidative regenerator may be of any suitable size for connection with the reactor or the solids separator. In addition, the regenerator may be operated at elevated temperatures in some cases (e.g., at least about 550° C., 575° C., 600° C., 625° C., 650° C., 675° C., 700° C., or higher). The temperature in the regenerator may be controlled so that the time averaged maximum temperature in the regenerator is less than 750° C., or less than 725° C., or less than 700° C., or less than 690° C., or less than 660° C., or less than 650° C., or less than 625° C. The temperature in the regenerator may be controlled so that the transient maximum temperature in the regenerator is less than 750° C., or less than 725° C., or less than 700° C., or less than 690° C., or less than 660° C., or less than 650° C., or less than 625° C. The residence time of the catalyst in the regenerator may also be controlled using methods known by those skilled in the art, including those outlined above. In some instances, the mass flow rate of the catalyst through the regenerator will be coupled to the flow rate(s) in the reactor and/or solids separator in order to preserve the mass balance in the system and/or to control the heat balance of the system. In some embodiments the regenerated catalyst may exit the regenerator via an exit port. The regenerated catalyst may be recycled back to the reactor via a recycle stream. In some cases, catalyst may be lost from, or intentionally removed from, the system during operation. In some such and other cases, additional "makeup" catalyst may be added to the system via a makeup stream. The regenerated and makeup catalyst may be fed to the reactor with the fluidization fluid via recycle stream, although in other embodiments, the catalyst, the makeup catalyst, and fluidization fluid may be fed to the reactor via separate streams.

In a preferred regeneration method, at least a portion of hot regenerated catalyst is separated from ash before returning to a catalyst feed hopper. In one embodiment, at least 75%, at least 50%, at least 30%, at least 20%, or at least 10% by weight of the ash is separated from the catalyst before the catalyst is returned to a catalyst feed hopper. At least a portion of the hot regenerated catalyst and flue gas can be passed through a series of cyclones to separate the catalyst from the ash; at least a portion of the oxygen-containing regeneration gas, after having reacted with the coke-contaminated catalyst, comprises flue gas from the regenerator; at least a portion of this hot flue gas can be used to heat the catalytic fast pyrolysis reactor. In preferred embodiments, at least a portion of the oxygen-containing regeneration gas comprises steam. A separate stream of steam can be introduced into the combustion reactor. The coke contaminated catalyst enters the combustion zone in one port and exits from a different port from the combustion zone; and the oxygen containing regeneration gas enters in one port and exits from a different port of the combustion zone.

In this specification, where it is mentioned that contaminants (such as coke or minerals) are "deposited on" a catalyst, it of course includes the possibility that contaminants are deposited "in" a catalyst. Typically, contaminants within pores in a catalyst are more difficult to remove and will take longer reaction times.

A preferred type of apparatus for oxidatively regenerating a coke-contaminated, fluid catalyst, comprises in combination: (1) a combustion chamber into which the coke-contaminated catalytic fast pyrolysis catalyst may be introduced and contacted with regeneration gas; (2) a disengagement chamber located adjacent to and above (with respect to gravity) the combustion chamber and in communication therewith; (3) optional heat removal apparatus comprising conduits containing heat absorbing fluid positioned within the combustion chamber, the conduits being sealed with respect to the interior of the combustion chamber such that the heat-absorbing material is in indirect heat exchanging contact with the interior of the heat removal chamber; (4) a regeneration gas inlet port connecting with a lower portion of the combustion chamber for introducing at least a portion of the regeneration gas into the lower portion of the combustion chamber below the level of the catalyst bed; (5) a catalyst exit conduit positioned above the regeneration gas inlet, and (6) a regeneration gas outlet port that allows the flue gas to exit the combustion reactor. A suitable reactor is a fluidized bed reactor.

Catalyst Washing

Typically, the catalyst that is regenerated in a washing step is first regenerated in one or more oxidative regeneration stages (usually the oxidative regeneration comprises combustion). The oxidatively regenerated catalyst may then be treated to remove ash, for example, by passage through one or more cyclone separators. Typically, it will be necessary to remove heat from the oxidatively regenerated catalyst prior to a washing step, and this heat is preferably at least partly recovered, for example, by preheating a fluidizing gas of the oxidative regeneration gas or of the biomass conversion reactor; likewise at least a portion of gas that is used to cool the oxidatively regenerated gas can be used as a fluidizing gas.

In the catalyst washing step at least a portion of said oxidatively regenerated catalyst is washed with a solution that at least partially removes the elements that have deposited on or in the catalyst. In this washing step of the catalyst regeneration the catalyst is treated by washing with a liquid, aqueous solution that at least partially removes the elements that have deposited thereon including but not limited to Mg, K, Ca, Na, Fe, Mn, S, or combinations thereof. The solution can be any solution including water, acidic water, basic water, water with surfactants, water with multi-dentate ligands such as EDTA, polyvinylalcohol, oxalic acid, citric acid, or any other material that removes the mineral elements without damaging the zeolite structure or removing significant quantities of catalytically active elements or promoters or damaging the binder. Preferred solutions include ammonium salts such as ammonium nitrate, ammonium acetate, ammonium oxalate, or ammonium phosphate, but not limited to these. Other solvent solutions can be used including alcohols, ethers, organic acids, amines, supercritical CO2, or other materials. The extraction process can be operated at any temperature from about 20° C. to about 200° C. depending on the nature of the mineral to be removed, the solvent and the catalyst. The extraction could be done under pressure. The extraction process could be conducted on a side stream or partial stream of the used catalyst rather than the entire stream of catalyst. This would allow removal and treatment of a side stream to reduce the size of the equipment. It also maintains the large majority of the catalyst at high temperature for recycle to the reactor reducing the requirement for reheating. An optional first treatment step could be either sifting or air classification to remove fines and the lighter weight ash particles.

In some embodiments the entire catalyst from an oxidative regeneration step is subjected to washing. In some other preferred embodiments, only a portion, such as 1 to 50%, or 2 to 40%, or 5 to 35%, or 10 to 30%, or less than 50%, or less than 25%, or less than 10%, or less than 5%, of the oxidatively regenerated catalyst is washed. The extraction process need not be conducted after each time the catalyst passes through the reactor and is regenerated oxidatively, in some embodiments the washing could be used on catalyst that has passed through the reactor many times and oxidatively regenerated, i.e., washed only after 1 to 1000 cycles, or 2 to 500 cycles, or 10 to 200 cycles, or 10 to 100 cycles, or at least 10 cycles, or at least 50 cycles, or at least 100 cycles through the reactor and oxidative regenerator, thus making the process more efficient and saving energy. In some embodiments a portion of the catalyst is separated from the remainder of the catalyst and subjected to the washing step before being returned to the reactor. This would allow removal and treatment of a side stream to reduce the size of the equipment. It also maintains a portion, preferably, the large majority of the catalyst at high temperature for recycle to the reactor; thus, reducing the requirement for reheating. In some embodiments the catalyst is treated with an optional treatment step before the washing step such as sifting or air classification to remove fines and the lighter weight ash particles before washing the catalyst. Removal of the fines may facilitate the washing step by making it easier to separate the washed catalyst from the wash solution when the content of fines is reduced. In some embodiments a portion of the fines removed before the washing step is returned to the reactor.

After washing is completed, the catalyst is preferably recovered by filtration, which, in some embodiments, is followed by heating, for example to remove water and residual ammonia or ammonium nitrate (in the case where heating reaches high temperatures). Any process for solids separation can be used to remove the catalyst from the wash solution such as gravity filtration, centrifugal filtration, pressure filtration, vacuum filtration, or others. Solid-liquid separation processes well known to those skilled in the art, such as in Solid-Liquid Separation (Fourth Edition), Ladislav Svarovsky, ed. 2001 Elsevier, incorporated herein by reference. An important feature of the extraction process is that it is not required to rigorously remove all of the mineral materials since small amounts of these materials, i.e., 1 ppm to 10% (based on total catalyst mass) may be useful to improve the catalyst life and stability, or may not significantly interfere with catalyst activity or selectivity. It also may be economically unattractive to remove the minerals to such small quantities since the process would take longer and consume more solvents etc. In some embodiments the K remaining on the catalyst after washing can be 1.8%, or 1.0%, or 0.6%, or 0.3% or 0.2%, or 0.1%, or 5000 ppm, or 1000 ppm, or 250 ppm or less, or 0.0001 to 2.5%, or 0.01 to 1.0%, or 0.2 to 0.5%. Prior to the washing step, catalyst that has been used for the catalytic pyrolysis of biomass may contain more than 2.0 mass % or more K depending on reaction conditions, length of exposure to biomass, and catalyst type. In some embodiments the Ca remaining on the catalyst after washing can be 1.8%, or 1.0%, or 0.6%, or 0.3% or 0.2%, or 0.1%, or 5000 ppm, or 1000 ppm, or 250 ppm or less, or 0.0001 to 2.5%, or 0.01 to 1.0%, or 0.2 to 0.5%. In some embodiments the Fe remaining on the catalyst after washing can be 1.8%, or 1.0%, or 0.6%, or 0.3% or 0.2%, or 0.1%, or 5000 ppm, or 1000 ppm, or 250 ppm or less. In some embodiments the Ti remaining on the catalyst after washing can be 1.8%, or 1.0%, or 0.6%, or 0.3% or 0.2%, or 0.1%, or 5000 ppm, or 1000 ppm, or 250 ppm or less. In some embodiments the Mg remaining on the catalyst after washing can be 1.8%, or 1.0%, or 0.6%, or 0.3% or 0.2%, or 0.1%, or 5000 ppm, or 1000 ppm, or 250 ppm or less. In some embodiments the S remaining on the catalyst after washing can be 1.8%, or 1.0%, or 0.6%, or 0.3% or 0.2%, or 0.1%, or 5000 ppm, or 1000 ppm, or 250 ppm or less.

In some embodiments active metals such as Ga, Zn, Co, Fe, Cr, Cu, V, Ni, Mn, Ag, Na, P, Sn, Zr, Nb, Y, Ti, Ce, La, or combinations thereof, can optionally be re-introduced into the catalyst after (or simultaneous with) the extraction step. This could be done by impregnation with an aqueous solution or other means. In some embodiments the active elements are introduced as components of a makeup catalyst.

The process of the present invention regenerates Brønsted acid sites on the catalyst to restore activity and selectivity for aromatics production. In some embodiments of this invention the regeneration process restores the Brønsted acid sites to at least 70%, at least 75%, at least 80%, at least 100%, or at least 120%, or from 70% to 170%, or from 75% to 150%, or from 80% to 120% of the number of Brønsted acid sites found in the fresh catalyst as determined in an IPA-TPD experiment. The IPA-TPD experiment as described in the examples is the technique by which Brønsted acid sites are determined in the present invention.

Active metals such as Ga, Zn, Co, Fe, Cr, Cu, V, Ni, Mn, Ag, Na, P, Sn, Zr, Nb, Y, Ti, Ce, La, or combinations thereof, can optionally be re-introduced after the extraction step. This could be done by re-impregnation with a dilute aqueous solution or other means known to those skilled in the art.

In some embodiments, a catalyst wash unit comprises a Soxhlet extractor. In some other embodiments, the catalyst wash unit comprises a stirred tank, a rotary mixer, a sprayed conveyor belt, or a rotary disk in which the catalyst is treated in several stages of liquid washing. Apparatus and methods for contacting solutions with catalysts are known to those skilled in the art.

Figure 8:
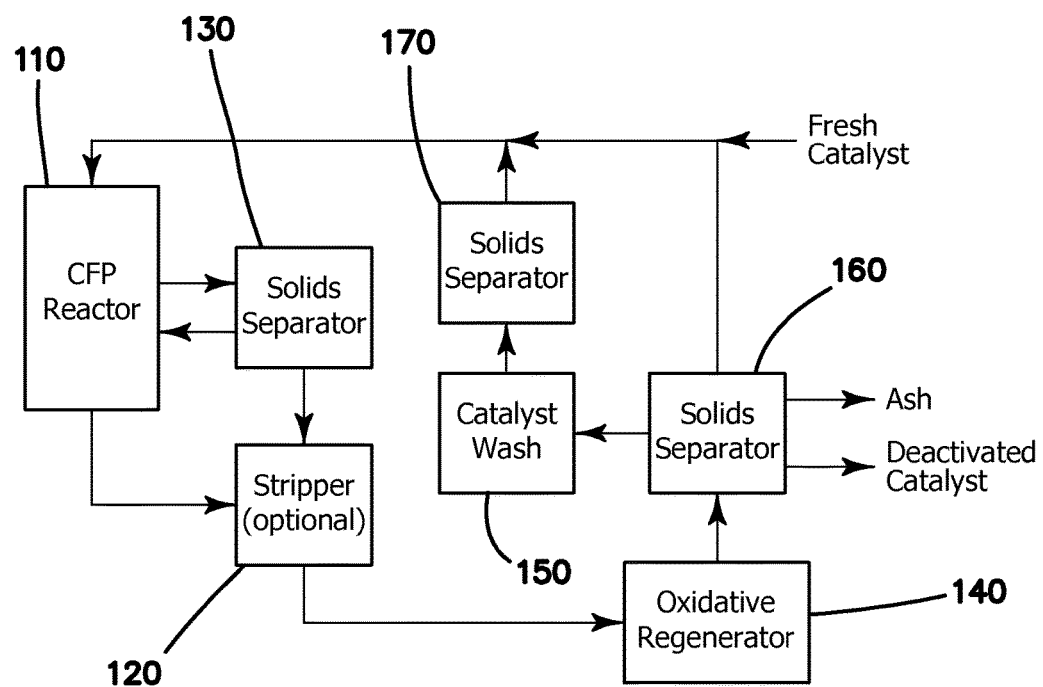
FIG. 8. Schematic flow chart illustrating regenerating CFP catalysts.

One embodiment of the process of this invention is summarized schematically in FIG. 8. In FIG. 8 the CFP process is conducted in reactor 110. Used catalyst from the CFP process is removed via a conduit that optionally supplies catalyst stripper 120. Reaction products from the CFP process pass through solids separator 130 where catalyst fines and other solid materials are separated from the vapor products. Solids separated in separator 130 can be returned to the CFP reactor 110 or can be fed to optional stripper or can be transported to the oxidative regenerator 140, or some combination of these. Solids exiting optional stripper 120, or directly from CFP reactor 110 if the stripper is not included, are transported to oxidative regenerator 140. Coked catalyst is oxidatively regenerated in oxidative regenerator 140 by admission of an oxidation gas. Catalyst oxidative regenerator 140 can comprise more than one unit. Oxidatively regenerated catalyst is transported to solids separator 160 where catalyst is separated from the combustion gases, and optionally ash is separated from the oxidatively regenerated catalyst. Solids separator 160 can comprise more than one unit. A portion of the oxidatively regenerated catalyst is transported to catalyst wash unit 150 where it is washed with a wash solution. Washed catalyst is separated from the wash solution in solids separator 170, optionally dried (not shown), and returned to the CFP reactor. Oxidatively regenerated catalyst is returned to the reactor 110. Fresh catalyst is also introduced into reactor 110, optionally with the oxidatively regenerated catalyst, or the washed catalyst, or some combination thereof, or in a separate stream (not shown). Deactivated catalyst can be removed from the system from solids separator 160 or optionally before the catalyst is oxidatively regenerated.

Catalytic Fast Pyrolysis

The reactor comprises any suitable reactor known to those skilled in the art. For example, in some instances, the reactor may comprise a continuously stirred tank reactor (CSTR), a batch reactor, a semi-batch reactor, or a fixed bed catalytic reactor, among others. In some cases, the reactor comprises a fluidized bed reactor, e.g., a circulating fluidized bed reactor, a moving bed reactor such as a riser reactor, or a bubbling bed reactor. Fluidized bed reactors may, in some cases, provide improved mixing of the catalyst and/or hydrocarbonaceous material during pyrolysis and/or subsequent reactions, which may lead to enhanced control over the reaction products formed. The use of fluidized bed reactors may also lead to improved heat transfer within the reactor. In addition, improved mixing in a fluidized bed reactor may lead to a reduction of the amount of coke adhered to the catalyst, resulting in reduced deactivation of the catalyst in some cases. Throughout this specification, various compositions are referred to as process streams; however, it should be understood that the processes could also be conducted in batch mode. Examples of suitable apparatus and process conditions for CFP are described in U.S. Pat. No. 8,277,643 of Huber et al. and in the US Patent Application 20130060070A1 of Huber et al. which are incorporated herein by reference.

The temperatures in the catalytic fast pyrolysis reactor where catalyst is present (which may be measured by one or more thermocouples in contact with a catalyst bed) are preferably in the range of 500 to 700° C.; more preferably in the range of 520 to 600° C.; and in some embodiments in the range of 540 to 580° C. In the CFP reactor, catalyst is disposed along a length of at least 20 cm, at least 50 cm, at least 1 meter, at least 2 meters, at least 5 meters, in some embodiments up to 25 meters in the reactor (length is by definition the direction of flow through the reactor). The catalytic fast pyrolysis is conducted in the absence of any added metals other than metals present in or on the catalyst. The residence time of gases or feed molecules in the CFP reactor is at least 0.1 seconds, in some embodiments at least 0.3 seconds, in some embodiments at least 0.5 seconds, in some embodiments at least 1 second, in some embodiments at least 2 seconds, in some embodiments at least 3 seconds, in some embodiments at least 5 seconds, in some embodiments at least 10 seconds, and in some embodiments in the range of 0.3 to 15 seconds, in some embodiments 0.5 to 10 seconds.

In some embodiments, at least a portion of the olefins in the fluid hydrocarbon product stream is separated from the rest of the product stream to produce a recycle stream, comprising at least a portion of the separated olefins in the recycle stream.

Suitable methods for separating aromatics from other fluid hydrocarbon products are known to those of ordinary skill in the art. For example, aromatics can be separated from other fluid hydrocarbon products by cooling the product stream, or a portion thereof, to a suitable temperature and a second separator that separates at least a portion of the aromatics from other gaseous products (e.g., gaseous aromatics, $CO_2$, $CO$, etc.) and from an aqueous product stream. The methods and/or conditions used to perform the separation can depend upon the relative amounts and types of compounds present in the fluid hydrocarbon product stream, and one of ordinary skill in the art will be capable of selecting a method and the conditions suitable to achieve a given separation given the guidance provided herein.

In one set of embodiments, separated catalyst may exit the solids separator via an exit port. In some cases the separated catalyst and associated gases that exit the separator may contain significant quantities of organic compounds including aromatics and olefins. In some embodiments the catalyst and associated gas stream is 'stripped' of organics by treatment with a stream comprising steam that is passed over and through the catalyst. The steam-containing stream that is used to strip the organics can be fed to the reactor or can be directed to the separation train or can otherwise be combined with product streams for recovery of the valuable organic compounds.

It should be understood that, while the set of embodiments described above includes a reactor, solids separator, regenerator, catalyst wash unit, condenser, etc., not all embodiments will involve the use of these elements. For example, in some embodiments, the feed stream may be fed to a catalytic reactor, reacted, and the reaction products may be collected directly from the reactor and cooled without the use of a dedicated condenser. In some instances the product may be fed to a quench tower to which is fed a cooling fluid, preferably a liquid, most preferably water, along with the product stream to cool and condense the products. In some instances, while a dryer, grinding system, solids separator, regenerator, catalyst wash unit, condenser, and/or compressor may be used as part of the process, one or more of these elements may comprise separate units not fluidically and/or integrally connected to the reactor. In other embodiments, one or more of the dryer, grinding system, solids separator, regenerator, condenser, and/or compressor may be absent. In some embodiments, the desired reaction product(s) (e.g., liquid aromatic hydrocarbons, olefin hydrocarbons, gaseous products, etc.) may be recovered at any point in the production process (e.g., after passage through the reactor, after separation, after condensation, etc.).

The invention is generally applicable to any biomass pyrolysis reaction. Preferably, the biomass feedstock comprises a solid hydrocarbonaceous material. The biomass feedstock may comprise, for example, any one or combination of the biomass sources that are mentioned in the Glossary section.

The pyrolysis reactor comprises a solid catalyst for catalytic pyrolysis. The type of reactor and the type of solid catalyst (if present) can be generally of the type known for conversion of biomass to fluid hydrocarbonaceous streams. Examples of suitable apparatus and process conditions for CFP include those described in U.S Pat. No. 8,277,643 by Huber at al., which is incorporated herein by reference. Conditions for CFP of biomass can be selected from any one or any combination of the following features (which are not intended to limit the broader aspects of the invention): a zeolite catalyst, a ZSM-5 catalyst; a zeolite catalyst comprising one or more of the following metals: titanium, vanadium, chromium, manganese, iron, cobalt, nickel, copper, zinc, gallium, platinum, palladium, silver, tin, phosphorus, sodium, potassium, magnesium, calcium, tungsten, zirconium, cerium, lanthanum, and combinations thereof; a fluidized bed, circulating bed, or riser reactor; an operating temperature in the range of 300° to 1000° C.; and/or a solid catalyst to biomass mass ratio of between 0.1 and 20. In some preferred embodiments, the catalyst comprises zinc, gallium, iron, tin, chromium, lanthanum, or some combination of these.

Preferred catalysts comprise solid phosphoric acid (such as phosphoric acid on kieselguhr) or zeolites ZSM5, ZSM11, ZSM12, ZSM22, ZSM23, ZSM35, ZSM49, and MCM56. Regenerated catalyst can be used, including regenerated ZSM-5 from the CFP process. A preferred temperature range is 400 to 600° C., more preferably 450 to 575° C.; although higher temperatures could be used. Pressures preferably are in the range of 1 atm to 20 atm, more preferably 1-5 atm. The reaction can be conducted in various types of reactors, but preferably is conducted in a fluidized bed reactor.

In the desorption curve of an isopropyl amine temperature programmed desorption (IPA-TPD) experiment, the sharp desorption at 270-380° C. is assigned to IPA decomposition into propylene and NH3 occurring on the Brønsted acid sites. The peak area under the desorption curve measured from 270 to 380° C. is used for quantifying the number of Brønsted acid sites for a particular sample. The desorption curve measured from 130-270° C. is assigned to weak acid sites. Whilst not wishing to be bound by theory, it has been observed that the Brønsted acid sites on the catalyst appear to be active for the preferred conversion of biomass to aromatics, whereas the weak acid sites are not as important. The process of the present invention regenerates Brønsted acid sites on the catalyst to restore activity and selectivity for aromatics production. In some embodiments of this invention the regeneration process restores the Brønsted acid sites to at least 70%, at least 75%, at least 80%, at least 100%, or at least 120%, or from 70% to 170%, or from 75% to 150%, or from 80% to 120% of the number of Brønsted acid sites found in the fresh catalyst as determined in an IPA-TPD experiment.

EXAMPLES

To simulate CFP of biomass, catalytic reactions of furan, a well known intermediate in the pyrolysis of biomass, were carried out in a fixed-bed stainless steel tubular reactor of 0.5 inch (1.27 cm) O.D. The catalyst, which was in the form of a fixed-bed of about 1.0 g of particulate solids, was held in the reactor by quartz wool. The catalyst was calcined at a temperature of 600° C. in an oven prior to the test. Nitrogen is used as the carrier gas with the flow rate of 500 mL/min. Furan was pumped into the nitrogen stream using a syringe pump to achieve a concentration of approximately 0.7% by volume. Prior to the test run, the furan bypasses the reactor for 30 min. The nitrogen stream containing the furan was then switched to go through the reactor. An air cooled condenser was used to trap the heavy products. Gas phase products were collected in gas bags. All runs were conducted at atmospheric pressure with a pressure drop of 4-7 psig across the catalyst bed. After the reaction process was completed, the furan was stopped, while keeping a flow of nitrogen bypassing the reactor for 10 min. The nitrogen stream was then switched to go through the reactor for 10 min to flush additional products into the gas collection bag. The reactor was allowed to cool after it has been flushed with nitrogen. Gas products were quantified by GC-FID/TCD (Shimadzu 2014). All hydrocarbons in the gas phase products were quantified by the GC-FID. The C0 and CO2 in the gas phase products were quantified by the GC-TCD. The GC-FID was calibrated using a standard mixture of C1-C6 hydrocarbons (olefins and paraffins), furan, benzene, toluene, xylenes (gas phase standards are prepared for these aromatics that can vaporize at room temperature), ethylbenzene, styrene, indene, naphthalene, and benzofuran. The sensitivity of a hydrocarbon was assumed to be proportional the number of carbon atoms in the compound as compared to that of a compound of similar structure (e.g. styrene vs. methylstyrenes; indene vs. methylindenes). The GC-TCD is calibrated by CO and CO2 standards (5% CO2, 4% CO in helium).

The reaction conditions for the furan conversion were a temperature of 550° C., space velocity (WHSV) of 0.56 g/g/hr, and a partial pressure of ~5 torr. The furan was pumped with a pumping rate 0.06 mL/hr of liquid, and the carrier gas was maintained at ~500 sccm.

Catalyst Preparation

Example 1

Catalyst A (2% Zn/HZSM-5) was prepared by incipient wetness with the following procedure: Spray dried H-ZSM-5 obtained commercially was calcined five hours at 600° C. in air to remove any residual template or moisture and then 120 g of the calcined sample was impregnated with 65.1 g of solution of Zn(NO3)2 (10.9 wt %) in distilled water to achieve a zinc loading of 2% of metal by weight. The impregnated sample was dried at 120° C. for two hours and then heated at 10° C./min in a calcining oven and held for five hours at 600° C. The catalyst thus obtained with a nominal 2% zinc was tested in a fixed bed reactor for the conversion of furan to aromatics and olefins. A 1.0 g sample of the catalyst was charged to the reactor, held in place with quartz wool. A stream of 500 mL/min of N2 was passed over the catalyst and it was heated to 550 C. The N2 feed was diverted to pass through a furan solution to establish a furan flow of 0.6 mL/hr of liquid furan, or a space velocity (SV) of 0.56, and a residence time in the catalyst zone of 0.049 seconds. The whole product gas was collected and analyzed by GC at various times during the experiment as shown in Table 1.

Example 2

Catalyst B was obtained by impregnating 20 g of Sample A with 9.95 g of aqueous solution of KNO3 (9.5 wt %) by incipient wetness to achieve a K loading of 1.8% by weight potassium. The K-impregnated catalyst was dried at 120° C. for two hours and then heated at 10° C./min in a calcining oven and held for five hours at 600° C. The calcined catalyst thus obtained was tested in a fixed bed reactor for furan conversion to aromatics and olefins; the data are contained in Table 1. Upon completing the test, the catalyst was treated with flowing air (120 cc/min) at 600° C. for two hours to burn off coke and then the catalyst was removed from the reactor for water treatment.

Example 3

Catalyst C was obtained by extracting a sample of used, calcined Catalyst B with water. The sample of used, calcined Catalyst B was extracted in a Soxhlet extractor for two hours followed by drying at 120° C. for two hours. The dried catalyst was then tested in fixed bed reactor for furan conversion to aromatics and olefins.

Figure 2:
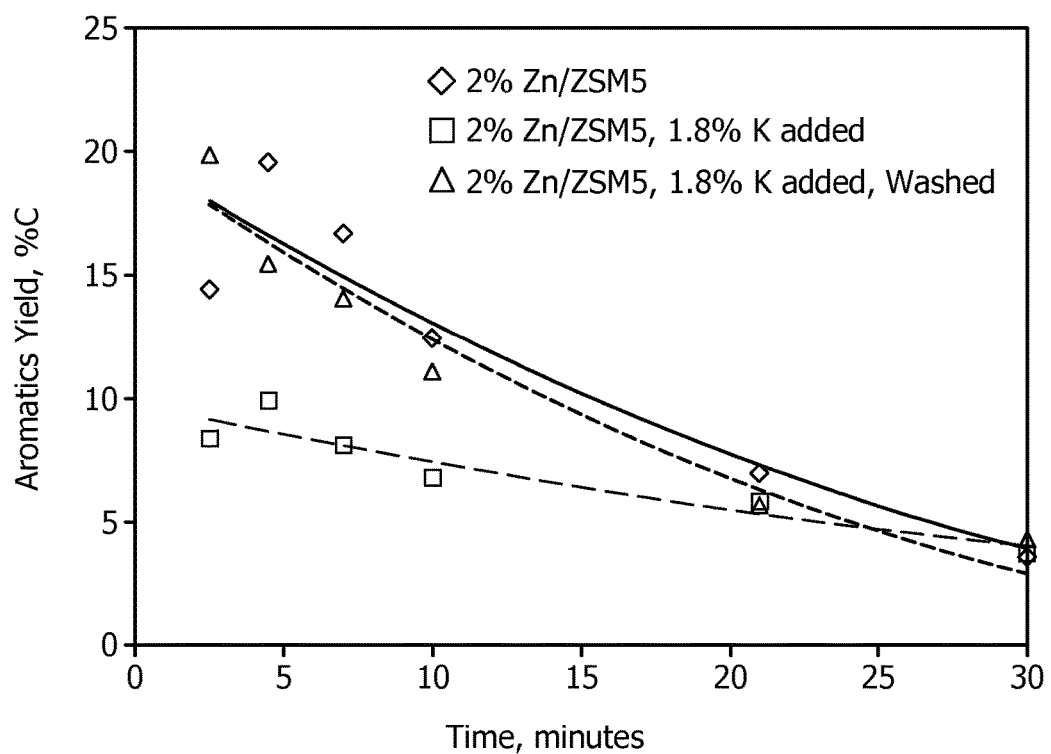
FIG. 2. Aromatic yield (% of carbon fed) vs time on stream for furan conversion at 550° C. for Catalyst A (2% Zn/ZSM-5), Catalyst B (2% Zn/ZSM-5, 1.8% K added) and Catalyst C (2% Zn/ZSM-5, 1.8% K added, Washed).

The results are shown in Table 1 and FIGS. 1 and 2. As can be seen in the figures, the presence of K on the catalyst caused a significant decrease in conversion and yield of the desired aromatics. The washing step improved conversion and returned aromatic yield to about the same yield as the catalyst before exposure to K.

TABLE 1

Furan conversion results.

| Example | Sample time, minutes | Furan Conversion % | Aromatics Yield, C % | Total C2-C5 olefins Yield, C % | CO Yield, C % | CO2 Yield, C % |
|---|---|---|---|---|---|---|
| 1 | 2.5 | 98.7 | 14.4 | 8.3 | 14.0 | 0.7 |
| 1 | 4.5 | 93.1 | 19.5 | 13.8 | 19.3 | 1.0 |
| 1 | 7 | 84.5 | 16.7 | 13.5 | 18.0 | 0.9 |
| 1 | 10 | 67.5 | 12.5 | 12.6 | 13.6 | 1.0 |
| 1 | 21 | 45.3 | 7.0 | 10.1 | 10.7 | 0.4 |
| 1 | 30 | 32.6 | 3.6 | 6.9 | 6.5 | 0.2 |
| 1 | 60 | 19.6 | 1.4 | 3.0 | 3.0 | 0.1 |
| 2 | 2.5 | 72.6 | 8.4 | 6.4 | 9.0 | 0.5 |
| 2 | 4.5 | 49.3 | 9.9 | 8.3 | 9.8 | 0.7 |
| 2 | 7 | 44.6 | 8.1 | 7.8 | 9.4 | 0.8 |
| 2 | 10 | 49.2 | 6.8 | 7.0 | 7.9 | 0.6 |
| 2 | 21 | 23.0 | 5.8 | 8.0 | 6.9 | 0.5 |
| 2 | 30 | 29.7 | 3.7 | 6.6 | 6.4 | 0.4 |
| 2 | 60 | 8.5 | 2.4 | 6.0 | 5.4 | 0.3 |
| 3 | 2.5 | 92.6 | 19.9 | 7.5 | 14.7 | 1.9 |
| 3 | 4.5 | 78.6 | 15.5 | 8.9 | 13.4 | 1.7 |
| 3 | 7 | 64.3 | 14.1 | 9.3 | 11.6 | 1.4 |
| 3 | 10 | 56.8 | 11.1 | 9.0 | 9.9 | 1.1 |
| 3 | 21 | 38.4 | 5.6 | 8.5 | 6.9 | 0.6 |
| 3 | 30 | 32.9 | 4.3 | 8.3 | 6.3 | 0.6 |
| 3 | 60 | 28.3 | 2.3 | 6.4 | 4.8 | 0.3 |

Impact of Coke Removal

Example 4

Catalyst D

Catalyst D of composition 2.0% Ga on spray dried ZSM-5 was prepared by incipient wetness impregnation of a commercially obtained ZSM-5 sample with a solution of Ga(NO3)3 in water. The material was calcined at 600° C. for four hours.

The catalyst was tested in a continuous catalyst flow experiment in a fluid bed reactor for 4 hours. A charge of 173 g of catalyst was initially charged to the reactor and catalyst was passed into and out of the reactor at the rate of 6 g/minute. During the 4-hour experiment 180.2 g of compressed newsprint was fed to the reactor in a continuous stream in a flow of N2. The fluidized bed reactor was maintained at a temperature of 575° C. in the hot zone. The catalyst that was removed from the reactor was designated as Catalyst D.

A portion of Catalyst D was evaluated by Temperature Programmed Oxidation (TPO) in flowing air in a TGA. The 1.93% weight loss at temperatures greater than 500° C. was ascribed to coke on the catalyst; weight losses at lower temperatures were due to moisture and adsorbed organic compounds.

Figure 3:
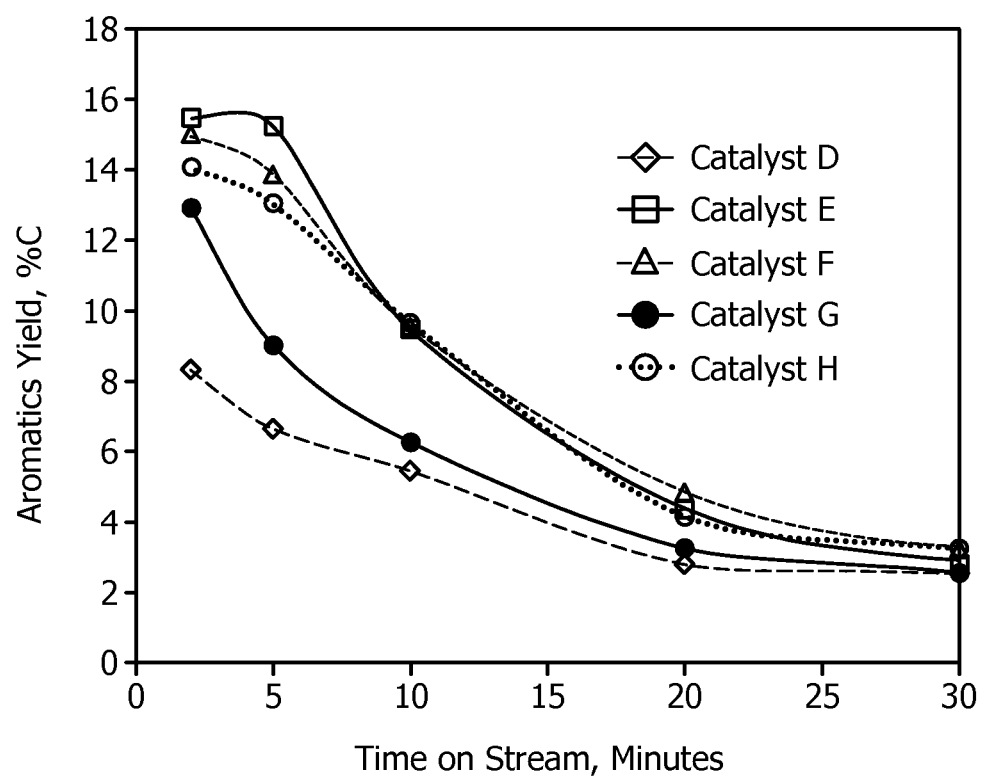
FIG. 3. Results of Examples 4 through 8. Aromatics yields as % of carbon fed in the conversion of furan over a fixed bed of catalyst at 550° C. for catalysts D through H. The aromatics yield of the coked catalyst D is much lower than the aromatics yield obtained with the fully regenerated catalysts (E and H), showing the impact of coke deposition on catalyst activity. Recovery of aromatics production by the partially regenerated catalyst F shows that not all Carbon (coke) must be removed to restore catalyst activity and aromatics production by catalyst G shows that partial removal of the carbon (coke) can restore part of the activity.

A portion of Catalyst D was tested in a fixed bed reactor for furan conversion to aromatics and olefins. The results are presented in Table 2 and in FIG. 3 and FIG. 4.

Example 5

Catalyst E

A portion of Catalyst D was treated by heating it in air for 25 mins at 600° C., in a flow of 20 sccm air to produce Catalyst E. A TPO of a sample of Catalyst E showed no weight loss at temperatures above 500° C., indicating that the coke was completely burned off (100% removed). A portion of Catalyst E was tested in a fixed bed reactor for furan conversion to aromatics and olefins. The results are presented in Table 2 and in FIG. 3 and FIG. 4.

Example 6

Catalyst F

A portion of Catalyst D was treated by heating it in air for 10 mins at 600° C., in a flow of 20 sccm air to produce Catalyst F. A TPO of a sample of Catalyst F showed 0.59% weight loss at temperatures above 500° C., indicating that 69% of the coke was burned off and 31% of the coke remained on the catalyst.

A portion of Catalyst F was tested in a fixed bed reactor for furan conversion to aromatics and olefins. The results are presented in Table 2 and in FIG. 3 and FIG. 4.

Example 7

Catalyst G

A portion of Catalyst D was treated by heating it in air for 3 mins at 60020 C., in a flow of 20 sccm air to produce Catalyst G. A TPO of a sample of Catalyst G showed 1.03% weight loss at temperatures above 500° C., indicating that 47% of the coke was burned off and 53% of the coke remained on the catalyst.

A portion of Catalyst G was tested in a fixed bed reactor for furan conversion to aromatics and olefins. The results are presented in Table 2 and in FIG. 3 and FIG. 4.

Example 8

Catalyst H

A portion of Catalyst D was treated by heating it in air in a calcining furnace for 2 hours at 600° C., to produce Catalyst H. A TPO of a sample of Catalyst H showed 0.0% weight loss at temperatures above 500° C., indicating that 100% of the coke was burned off and none of the coke remained on the catalyst.

A portion of Catalyst H was tested in a fixed bed reactor for furan conversion to aromatics and olefins. The results are presented in Table 2 and in FIG. 3 and FIG. 4.

TABLE 2

Results of TPO experiments on Catalysts D through H showing weight loss in the temperature range above 500° C. that is ascribed to coke on the catalyst, and the % coke removal of the coke originally on the coked catalyst.

| Example | Catalyst | % Weight Loss at T > 500° C. | % C Removed |
|---|---|---|---|
| 4 | D | 1.93 | 0 |
| 5 | E | 0.00 | 100 |
| 6 | F | 0.59 | 69 |
| 7 | G | 1.03 | 47 |
| 8 | H | 0.00 | 100 |

Figure 4:
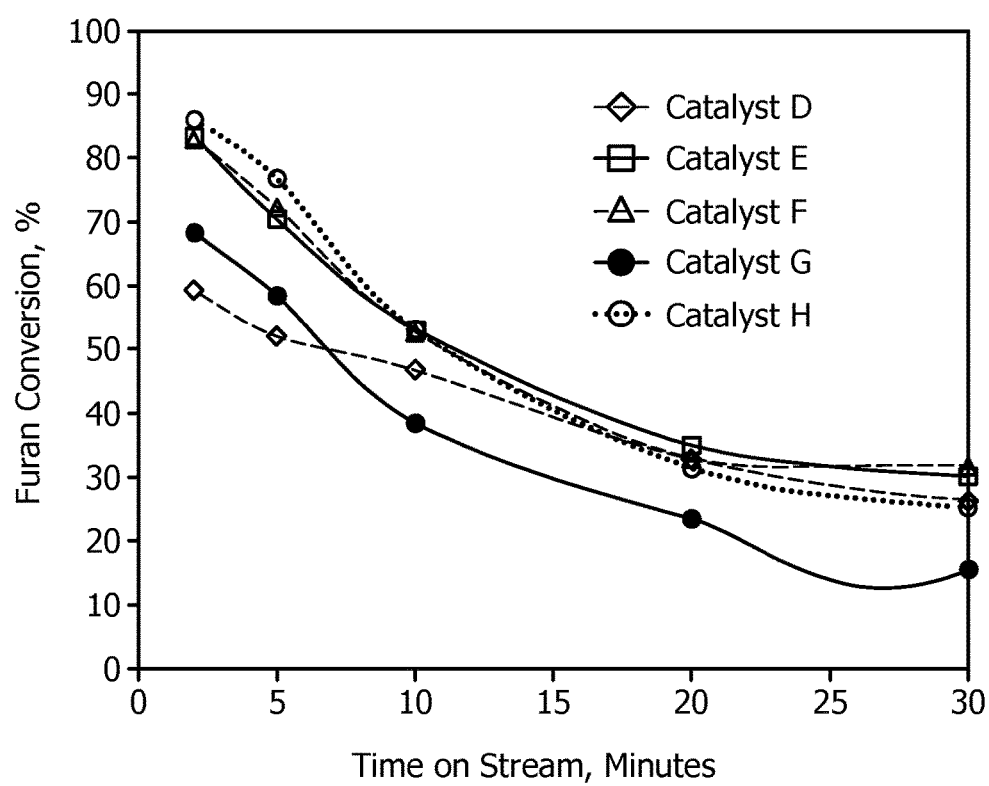
FIG. 4. Results of Examples 4 through 8. Furan conversions as % of furan fed in the conversion of furan over a fixed bed of catalyst at 550° C. for catalysts D through H. The furan conversion of the coked catalyst D is much lower than the furan conversion obtained with the fully regenerated catalysts (E and H), showing the impact of coke deposition on catalyst activity. Recovery of furan conversion by the partially regenerated catalyst F shows that not all carbon (coke) must be removed to restore catalyst activity and furan conversion by catalyst G shows that partial removal of the carbon (coke) can restore part of the activity.

The results in Table 2 and FIG. 4 show that removal of all the carbon from a carbon-deactivated catalyst is not necessary to restore the yield of aromatics in biomass conversion, as a catalyst with 0.59% carbon (catalyst F) was as active as the fully regenerated catalysts (catalysts E and H)

Example 9

Impact of Regeneration Temperature

Samples of catalyst D were installed in the fixed bed reactor and calcined in flowing air at various temperatures (550° C., 600° C., 650° C., 700° C.) for 30 min. Each of these samples was tested in the fixed bed reactor for furan conversion to aromatics and olefins. The results are presented in FIG. 5 and FIG. 6.

Figure 5:
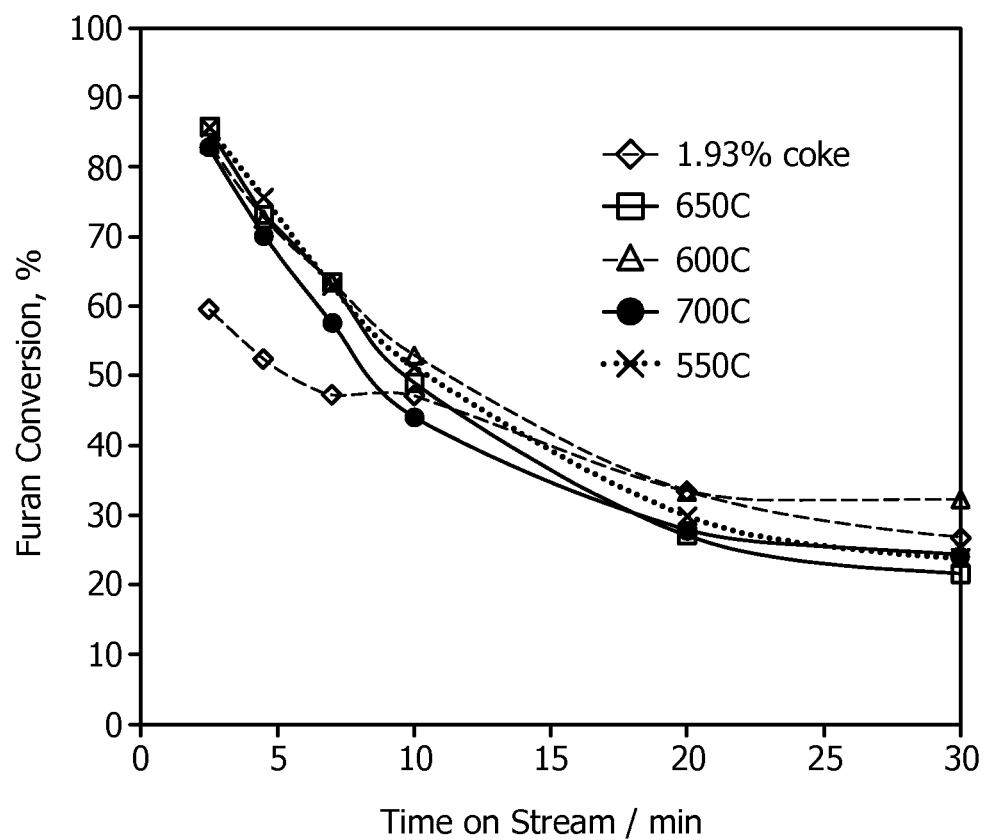
FIG. 5. Example 9, Furan conversions as % of furan fed in the conversion of furan over a fixed bed of catalyst at 550° C., after the coked catalyst D had been regenerated in air at the indicated temperatures (550° C., 600° C., 650° C., or 700° C.). The catalyst regenerated at 700° C. appears to have suffered some modest loss of furan conversion activity.
Figure 6:
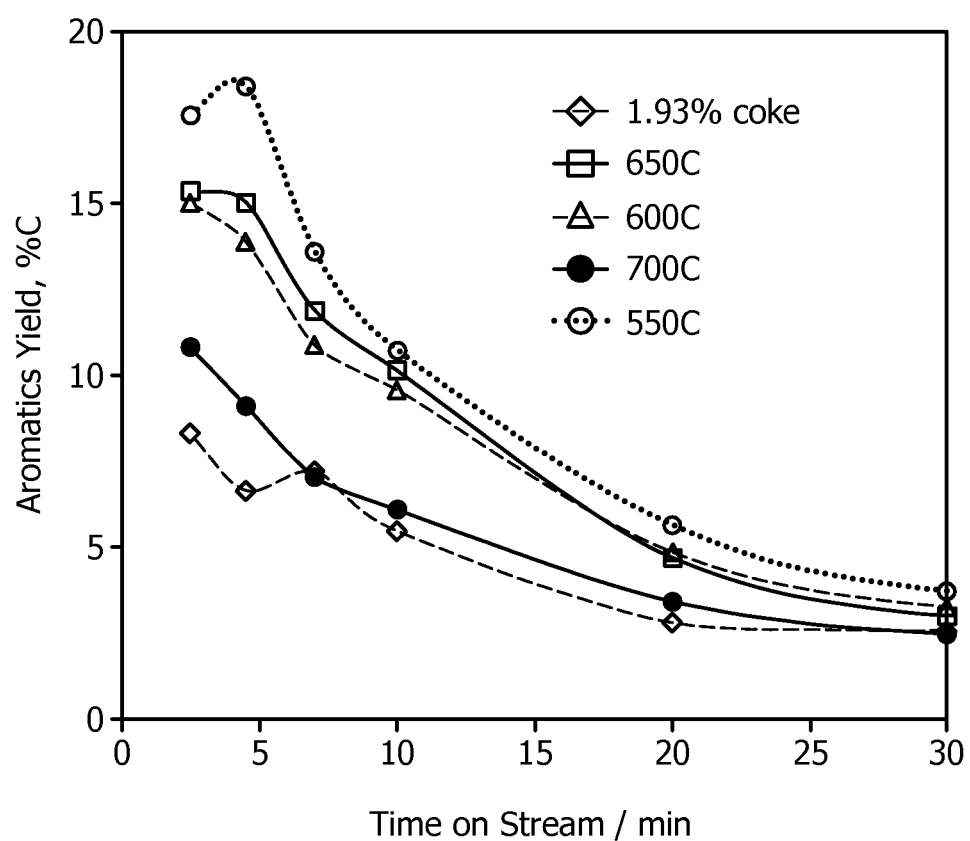
FIG. 6. Aromatics Yield as % of carbon fed in the conversion of furan over a fixed bed of catalyst at 550° C., after the coked Catalyst D had been regenerated in air at the indicated temperatures (550° C., 600° C., 650° C., or 700° C.). The catalyst regenerated at 700° C. shows a clear loss of aromatics formation activity. The catalyst regenerated at 550° C. may exhibit increased aromatics yield due to incomplete removal of the coke on the catalyst so that the carbon is available for further reaction.

The results in FIGS. 5 and 6 show that oxidative regeneration at 550° C. to 650° C. restored the aromatic yield of the catalyst to that of a fresh catalyst whereas oxidative regeneration at 700° C. was not as effective at restoring aromatics yield.

Example 10

Catalyst I

A sample of a commercially obtained fluid bed catalyst containing approximately 40 wt % ZSM-5 was calcined at 550° C. for 2 hours and designated Catalyst I.

Example 11

Catalyst J

A sample of catalyst I was impregnated with 2% Ca and 2% K by incipient wetness using an aqueous solution of the nitrate salts to form catalyst J. A sample of Catalyst J was tested for furan conversion; the results are in Table 3.

Example 12

Catalyst K

A sample of Catalyst J was regenerated by passing a dilute air stream through the used catalyst to form Catalyst K. A sample of catalyst K was tested for furan conversion and the results are presented in Table 3.

Example 13

Catalyst L

A sample of Catalyst K was treated by ion exchange with an aqueous solution of NH4NO3 (ammonium nitrate) to form Catalyst L. A sample of catalyst L was tested for furan conversion and the results are presented in Table 3.

Example 14

Catalyst M

A sample of Catalyst was extracted in a Soxhlet extractor for two hours followed by drying at 120° C. for two hours and calcining at 600° C. for two hours to form Catalyst M. A sample of catalyst M was tested for furan conversion and the results are presented in Table 3.

Samples of Catalysts I, J, K, L, and M were evaluated by temperature programmed desorption of isopropyl amine (IPA-TPD).

For the IPA-TPD experiments, a TGA instrument (Shimadzu TGA-50) is adjusted to read zero with an empty platinum sample cell. The sample cell is then filled with a sample of catalyst powder (10-30 mg). The catalyst is pre-treated at 500° C. under 50 mL/min N2. It is then cooled to 120° C. under a 50 mL/min flow of N2. Isopropylamine (IPA) is fed into the TGA chamber at this temperature by flowing a 2nd portion of N2 gas (<10 mL/min) through a bubbler filled with liquid IPA while monitoring the weight of the sample. The feed of IPA is stopped when the catalyst is saturated as indicated by no more weight increase. The flows of N2 are maintained through the chamber, but bypassing the IPA bubbler, for an additional 120 min to remove weakly adsorbed IPA. The TGA chamber is then heated up to 700° C. at a ramping rate of 10° C/min to obtain desorption curves, and the weight is monitored as a function of temperature. In the desorption curve, the sharp desorption at 270-380° C. is assigned to IPA decomposition into propylene and NH3 occurring on the Brønsted acid sites. The peak area under the desorption curve measured from 270 to 380° C. is used for quantifying the number of Brønsted acid sites for a particular sample. The desorption curve measured from 130-270° C. is assigned to weak acid sites.

The IPA-TPD results for Catalysts I, J, K, L, and M are summarized in Table 3.

TABLE 3

Results of furan conversion experiments and IPA-TPD tests of Catalysts I, J, K, L, and M.

| Example | Catalyst | Treatment | Furan Conversion % | Aromatics Selectivity % | Coke Selectivity % | Weak Acid sites, relative to Catalyst I | Brønsted acid sites relative to Catalyst I |
|---|---|---|---|---|---|---|---|
| 10 | I | Base Case | 27 | 37 | 14 | 100 | 100 |
| 11 | J | 2% Ca 2% K | 12 | 14 | 13 | 114 | 39 |
| 12 | K | J regenerated in air | 32 | 32 | 18 | 87 | 70 |
| 13 | L | K NH4 ion exchanged | 70 | 37 | 17 | 88 | 102 |
| 14 | M | K water extracted | 90 | 32 | 28 | 102 | 174 |

From the results in Table 3 it can be seen that deposition of 2% Ca and 2% K on an active CFP catalyst (catalyst I) to form a Ca- and K-containing catalyst (catalyst J) significantly reduces the activity of the catalyst for furan conversion and selectivity of the catalyst for aromatics production. It can further be seen from Table 3 that regeneration in air of the Ca- and K-containing catalyst (catalyst J) to form an oxidatively regenerated catalyst (catalyst K) restores conversion of furan but does not fully restore selectivity of the catalyst for aromatics. It can further be seen from Table 3 that when the Ca- and K-containing catalyst that had been oxidatively regenerated (catalyst K) is further treated with NH4NO3 to form a rejuvenated catalyst (catalyst L) the activity is restored and enhanced with respect to the base case and the selectivity for aromatics is fully restored to that of the fresh catalyst (catalyst I). It can further be seen in Table 3 that treatment of the Ca- and K-containing catalyst that had been regenerated (catalyst K) with water alone to form a water-treated catalyst (catalyst M) improves the activity of the catalyst but does not restore the selectivity of the catalyst to the same as the fresh catalyst (catalyst I). Further the water-treated catalyst (catalyst M) shows enhanced selectivity for coke formation.

The results in Table 3 further show that restoring the Brønsted acid sites to the used catalyst is correlated with restoring conversion and aromatics selectivity of the catalyst, ie catalysts K, L, and M all show increased conversion and aromatics selectivity compared to catalyst J. Further, treatments of the catalyst that produce significantly more Brønsted acid sites than were present in the fresh catalyst (catalyst I) produce a catalyst (catalyst M) with high activity but reduced selectivity for aromatics compared to the fresh catalyst.

Example 15

Catalytic fast pyrolysis (CFP) of hardwood was conducted in a fluidized bed reactor. The fluidized bed reactor was 2 inches outer diameter (OD) and 24 inches in height and was made of 316 stainless steel. Inside the reactor, the catalyst bed was supported by a distributor plate made of 316 stainless steel plate with 1/16 inch circular openings. The reactor was fitted with a feed hopper with a screw auger that metered biomass out of the hopper into a 0.25 inch OD conduit downward into the reactor.

The reactor was loaded with 172 g of catalyst I prior to the experiment. The hardwood was ground and sieved to 20-40 mesh particle size. About 400 grams of hardwood was weighed and loaded into the hopper system. The reactor was purged with a flow of N2 at 3.0 SLPM for 30 minutes prior to starting the experiment.

The reactor was heated to 575° C. and the fluidization gas feeding tube was heated to approximately 500° C. Biomass flow rate was accurately controlled by an augur inside the hopper that delivers the biomass to the feed tube. The solid biomass (hardwood) was introduced into the reactor from a side feed tube with N2 flow. Gas flow rate through the biomass feed tube was 3 SLPM to the reactor. The biomass feed rate was adjusted to about 1.5 g/min. During reaction, 1.5 SLPM of N2 was passed into the reactor through the distributor plate to fluidize the catalyst in addition to the feed tube N2 flow.

The reactor effluent exited the reactor from the top through a heated cyclone (350° C.) to remove solid particles, including small catalyst and char. The effluent exiting the cyclone flowed into a product collection system that included two bubblers and three condensers. The bubblers were placed in an ice water bath and charged with 150 ml of isopropanol inside as solvent; the three condensers contained no solvent and were placed inside a Dry Ice/isopropanol bath. The uncondensed gas phase products that exited the last condenser were collected in gas bags. The reaction time was 30 min and two gas bag samples were taken at 15 and 30 minutes time on stream after initiating the feed of biomass. After each bag was taken, the total gas flow rate was measured with a bubble flow meter; at least 4 measurements were made and the average was used for performance calculations. The gas bags samples were analyzed by injection into a Shimadzu GC 2010 that had been calibrated with analytical standard gas mixtures.

The contents of each of the two bubblers were collected. The contents of the three condensers were weighed and combined into a single sample. The condensers were rinsed with isopropanol to produce a fourth sample. All 4 liquid volumes were measured and weights determined. Liquid samples were all analyzed by injection into a Shimadzu GC 2014.

Example 16

The experiment in Example was repeated except a sample of 172 g of Catalyst J was used in place of Catalyst I. The results of the Examples 15 and 16 are shown in Table 4.

The results in Table 4 confirm that Ca and K added to the catalyst reduce the selectivity to aromatics from 19.6% to 9.3% in a similar manner to that observed in the fixed bed furan experiments, where the selectivity was reduced from 37 to 13% (see Examples 10 and 11). These experiments demonstrate that the same effects observed in the fixed bed with model compounds such as furan are observed with a biomass sample such as hardwood. The results show that 2% K and 2% Ca on a catalyst are effective concentrations of the minerals to severely reduce the production of aromatics from biomass.

TABLE 4

Results of fluid bed biomass conversion experiments with a fresh catalyst (I) and a Ca- and K-containing catalyst (J).

|  | Example 15 | Example 16 |
|---|---|---|
| Catalyst | I | J |
| Minerals | none | 2% Ca, 2% K |
| Catalyst Loading, g | 172.98 | 172.91 |
| Feed rate, g/min | 1.6 | 1.5 |
| Carbon Selectivities, % |  |  |
| Aromatics | 19.64% | 9.34% |
| Olefins | 9.50% | 11.09% |
| CO | 10.58% | 8.59% |
| Methane | 13.58% | 10.60% |
| CO2 | 5.12% | 7.21% |
| Parafins, alkynes, furans | 7.60% | 10.90% |
| Unknown, oxygenates | 1.20% | 9.30% |
| Coke | 16.20% | 17.20% |
| Char | 16.57% | 15.74% |

Example 17

The experiment of Example 15 was repeated with a fresh batch of 172 g of Catalyst I. At the end of the experiment the catalyst was regenerated by passing air through the catalyst with the temperature of the bed controlled to be 600° C.

The experiment of Example 15 was repeated with the catalyst that was oxidatively regenerated at 600° C. The results are contained in Table 5.

Example 18

The experiment of Example 15 was repeated with a fresh batch of 172 g of Catalyst I. At the end of the experiment the catalyst was regenerated by passing air through the catalyst with the temperature of the bed controlled to be 690 C.

The experiment of Example 15 was repeated with the catalyst that was oxidatively regenerated at 690° C. The results are contained in Table 5.

Example 19

The experiment of Example 15 was repeated with a fresh batch of 172 g of a commercially obtained fluid bed catalyst containing approximately 40% ZSM-5, designated Catalyst N. At the end of the experiment the catalyst was regenerated by passing air through the catalyst with the temperature of the bed controlled to be 600° C.

The experiment of Example 15 was repeated with the catalyst that was oxidatively regenerated at 600° C. The results are contained in Table 5.

Example 20

The experiment of Example 15 was repeated with a fresh batch of 172 g of Catalyst N. At the end of the experiment the catalyst was regenerated by passing air through the catalyst with the temperature of the bed controlled to be 690° C.

The experiment of Example 15 was repeated with the catalyst that was oxidatively regenerated at 690° C. The results are contained in Table 5.

The data contained in Table 5 demonstrate that the CFP process provides a better yield of aromatics, olefins, and aromatics plus olefins when the oxidative regeneration of catalysts is carried out at temperatures less than 690° C.

TABLE 5

Results of fluid bed experiments of catalysts regenerated at different temperatures.

|  | Example 17 | Example 18 | Example 19 | Example 20 |
|---|---|---|---|---|
| Regeneration temp | 600 | 690 | 600 | 690 |
| Reaction Temp | 575 | 575 | 575 | 575 |
| WHSV | 1.04 | 0.43 | 1.01 | 0.9 |
| Aromatics | 19.64 | 14.22 | 21.95 | 16.94 |
| Olefins | 9.50 | 7.50 | 9.66 | 6.83 |

Example 21

Catalyst O (2%La/HZSM-5) was prepared by incipient wetness with the following procedure: Spray dried H-ZSM-5 obtained commercially was calcined five hours at 600° C. in air to remove any residual template or moisture and then 120 g of the calcined sample was impregnated with a solution of La(NO3)3 in distilled water to achieve a lanthanum loading of 4% of La by weight. The impregnated sample was dried at 120° C. for two hours and then heated at 10° C./min in a calcining oven and held for five hours at 600° C. The catalyst thus obtained with a nominal 4% La was tested in a fixed bed reactor for the conversion of furan to aromatics and olefins. A 1.0 g sample of the catalyst O was charged to the reactor, held in place with quartz wool. A stream of 500 mL/min of N2 was passed over the catalyst and it was heated to 550° C. The N2 feed was diverted to pass through a furan solution to establish a furan flow of 0.6 mL/hr of liquid furan, or a space velocity (SV) of 0.56, and a residence time in the catalyst zone of 0.049 seconds. The whole product gas was collected and analyzed by GC at various times during the experiment. The average of the results obtained at the 5.5, 10, and 20 minutes on stream were averaged, and the results compiled in Table 6.

Example 22

A sample of Catalyst O was impregnated with an aqueous solution of Ca(NO3)2 to obtain a catalyst 2% Ca by weight, designated catalyst P. The experiment of Example 21 was repeated with catalyst P and the results collected in Table 6.

Example 23

A sample of catalyst P was washed with water by placing it in a Soxhlet extractor and refluxing water over the catalyst for 2 hours. A 1.0 g sample of the catalyst, designated Catalyst Q, was dried at 120° C. for two hours and charged to the reactor. The experiment of Example 21 was repeated with the washed catalyst Q and the results are summarized in Table 6.

Comparison of Example 23 with Example 22 shows that water washing a metal promoted catalyst that has been deactivated in biomass pyrolysis can at least partially restore the activity of the catalyst.

TABLE 6

|  | Example 21 | Example 22 | Example 23 |
|---|---|---|---|
| Catalyst | O | P | Q |
| Promoter | 4% La | 4% La, 2% Ca | 4% La, 2% Ca washed |
| Temperature, °C. | 550 | 550 | 550 |
| Furan WHSV | 0.56 | 0.56 | 0.56 |
| N2 flow, cc/min | 500 | 500 | 500 |
| Furan Conversion, % | 87.8 | 55.2 | 62.5 |
| Aromatics Yield, C % | 11.7 | 7.7 | 10.2 |
| Aromatics Sel % | 13.2 | 14.0 | 16.3 |
| Total C2-C5 olefins Yield, C % | 15.6 | 10.6 | 11.2 |
| CO Yield, C % | 10.7 | 6.3 | 7.1 |
| CO2 Yield, C % | 3.1 | 2.2 | 2.1 |
| BTX Sel, % | 91.5 | 89.7 | 91.2 |
| Aromatics + Olefins Yield C % | 27.4 | 18.3 | 21.3 |
| BTX Yield | 10.8 | 7.0 | 9.3 |

Example 24

A sample of catalyst I was characterized by IPA-TPD and was tested for the conversion of furfural in a fixed bed experiment as in Example 1, except furfural was used in place of furan, the WHSV was 0.668 hr-1, and the temperature was 575° C. In the IPA-TPD desorption curve, the sharp desorption at 270 -380° C. is assigned to IPA decomposition into propylene and $NH_3$ occurring on the Brønsted acid sites. The peak area under the desorption curve measured from 270 to 380° C. is used for quantifying the number of Brønsted acid sites for a particular sample, and is represented in Table as % Brønsted acid sites by direct integration. The data were analyzed by deconvolution of the IPA-TPD curve into individual desorption peaks assigned to Brønsted acid sites (centered at about 320° C.), to weak acid sites (centered at about 210° C.), and to strong acid sites (centered at about 400° C.). The results of the computational deconvolution of the peaks as Gaussian curves are identified in Table 7 as % Brønsted acid sites by deconvolution. The results are summarized in Table 7.

Example 25

A sample of catalyst I was impregnated with 0.2% by weight Ca from an aqueous solution of calcium nitrate in water and designated catalyst R. Catalyst R was characterized by IPA-TPD and was tested for the conversion of furfural in a fixed bed experiment as in Example 24. The results are summarized in Table 7.

Example 26

A sample of catalyst I was impregnated with 0.5% by weight Ca from an aqueous solution of calcium nitrate in water and designated catalyst S. Catalyst S was characterized by IPA-TPD and was tested for the conversion of furfural in a fixed bed experiment as in Example 24. The results are summarized in Table 7.

Figure 7:
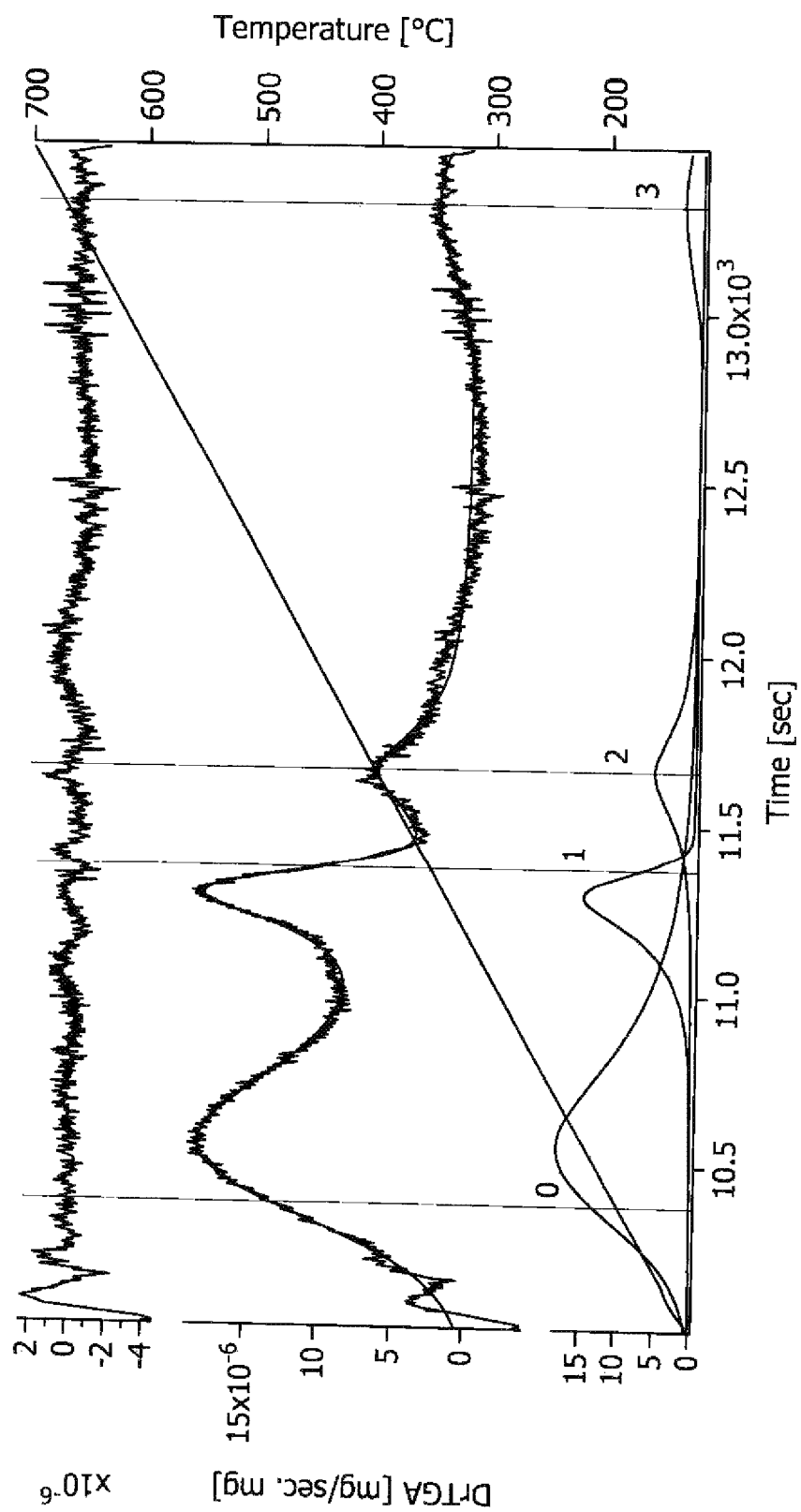
FIG. 7. The IPA-TPD trace for catalyst S, Center: raw data, Bottom: deconvoluted peaks, Top: Residual which is the difference between the raw and deconvoluted traces. The straight (sloped) line is the temperature program used during the TPD experiment.

The IPA-TPD of catalyst S, including the raw trace, the deconvoluted trace, and the residual (raw minus deconvoluted) are presented in FIG. 7.

Example 27

A sample of catalyst I was impregnated with 1.0% by weight Ca from an aqueous solution of calcium nitrate in water and designated catalyst T. Catalyst T was characterized by IPA-TPD and was tested for the conversion of furfural in a fixed bed experiment as in Example 24. The results are summarized in Table 7.

Example 28

A sample of catalyst I was impregnated with 2.5% by weight Ca from an aqueous solution of calcium nitrate in water and designated catalyst U. Catalyst U was characterized by IPA-TPD and was tested for the conversion of furfural in a fixed bed experiment as in Example 24. The results are summarized in Table 7.

Example 29

A sample of catalyst I was impregnated with 5.0% by weight Ca from an aqueous solution of calcium nitrate in water and designated catalyst V. Catalyst V was characterized by IPA-TPD and was tested for the conversion of furfural in a fixed bed experiment as in Example 24. The results are summarized in Table 7.

The results in Table 7 demonstrate that addition of Ca up to about 1.0% (Examples 25, 26, 27) does not significantly reduce the formation of aromatics compared to the fresh catalyst (Example 24), and amounts of Ca from 0.2-0.5% increase the formation of aromatics. The results in Table 7 show that amounts of Ca from 0.2-1.0% (Examples 25, 26, 27) increase the sum of the aromatic and olefinic products compared to the Ca-free catalyst (Example 24).

TABLE 7

Experimental results of furfural conversion over catalysts impregnated with Ca.

| | Example | | | | | |
|---|---|---|---|---|---|---|
| | 24 | 25 | 26 | 27 | 28 | 29 |
| | Catalyst | | | | | |
| | I | R | S | T | U | V |
| Ca content, wt % | 0 | 0.2 | 0.5 | 1.0 | 2.5 | 5.0 |
| Aromatics C yield (%) | 20.52 | 24.21 | 23.46 | 19.63 | 13.95 | 6.27 |
| Olefins C yield (%) | 7.89 | 10.08 | 9.99 | 9.00 | 6.50 | 4.69 |
| Oxygenates C yield (%) | 8.63 | 9.48 | 2.19 | 6.40 | 20.76 | 43.13 |
| Brønsted acidity, mmol/mg | 0.0562 | 0.0578 | 0.0618 | 0.0600 | 0.0511 | 0.0404 |
| % Brønsted acid sites by deconvolution | 100 | 103 | 110 | 107 | 91 | 72 |
| % Brønsted acid sites by direct integration | 100 | 114 | 94 | 94 | 65 | 58 |
| % Aromatics vs Base | 100 | 118 | 114 | 96 | 68 | 31 |

Example 30

Catalyst W

A sample of catalyst V was placed in a flask and a solution of 0.1 M citric acid was introduced. The mixture was stirred gently at room temperature for 5 hours. The solid was separated by filtration, dried and calcined at 500° C. for 4 hours. It was designated Catalyst W. Catalyst W was characterized by IPA-TPD and was tested for the conversion of furfural in a fixed bed experiment as in Example 24. The results are summarized in Table 8.

Example 31

Catalyst X

A sample of catalyst V was placed in a flask and a solution of 0.1 M oxalic acid was introduced. The mixture was stirred gently at room temperature for 5 hours. The solid was separated by filtration, dried and calcined at 500° C. for 4 hours. It was designated Catalyst X. Catalyst X was characterized by IPA-TPD and was tested for the conversion of furfural in a fixed bed experiment as in Example 24. The results are summarized in Table 8.

Example 32

Catalyst Y

A sample of catalyst V was placed in a flask and a solution of 0.1 M ammonium nitrate was introduced. The mixture was stirred gently at room temperature for 5 hours. The solid was separated by filtration, dried and calcined at 500° C. for 4 hours. It was designated Catalyst Y. Catalyst Y was characterized by IPA-TPD and was tested for the conversion of furfural in a fixed bed experiment as in Example 24. The results are summarized in Table 8.

Example 33

Catalyst Z

A sample of catalyst V was placed in a flask and deionized water was introduced. The mixture was stirred gently at room temperature for 5 hours. The solid was separated by filtration, dried and calcined at 500° C. for 4 hours. It was designated Catalyst Z. Catalyst Z was characterized by IPA-TPD and was tested for the conversion of furfural in a fixed bed experiment as in Example 24. The results are summarized in Table 8.

The results in Table 8 show that treatment of Ca-containing catalysts with citric acid, oxalic acid, or ammonium nitrate restore significant activity of the catalyst for the conversion of biomass materials to aromatic compounds. The result of Experiment 33 shows that treatment of the catalyst with water also restores significant activity for the conversion of biomass materials to aromatic compounds. The results in Table 8 show that treatment of Ca-containing catalysts with citric acid, oxalic acid, or ammonium nitrate restore significant Brønsted acidity of the catalyst as measured by IPA-TPD. The result of Experiment 33 shows that treatment of the catalyst with water also restores significant Brønsted acidity of the catalyst as measured by IPA-TPD.

TABLE 8

Experimental results of catalyst tests and analyses.

| Example | Catalyst | Wash Solution | Brønsted Acidity mmol/mg | Brønsted Acidity, % of Base Case | Aromatics Yield, % C |
| --- | --- | --- | --- | --- | --- |
| 29 | V | None | 0.0404 | 76 | 6.23 |
| 30 | W | Citric acid | 0.0629 | 112 | 14.46 |
| 31 | X | Oxalic acid | 0.0520 | 93 | 15.68 |
| 32 | Y | NH4NO3 | 0.0603 | 107 | 16.57 |
| 33 | Z | Water | 0.0536 | 95 | 11.87 |

The invention claimed is:

1. A method of converting biomass to hydrocarbon products, comprising:
   feeding biomass into a reactor;
   pyrolyzing the biomass in the reactor in the presence of a catalyst comprising ZSM-5 to produce hydrocarbon products, wherein the zeolite catalyst comprises Brønsted acid sites and wherein the pyrolysis results in a coke-contaminated catalyst comprising at least 0.59% coke by mass;
   removing the coke-contaminated catalyst from the reactor;
   reacting the coke-contaminated catalyst with an oxidant to produce an oxidatively regenerated catalyst;
   washing 1% to 50% by mass of the oxidatively regenerated catalyst with a liquid, wherein the washing step regenerates Brønsted acid sites;
   separating the washed oxidatively regenerated catalyst from the liquid; and
   returning at least a portion of the separated washed oxidatively regenerated catalyst to the reactor.

2. The method of claim 1 a carbon content of the washed oxidatively regenerated catalyst is less than 1.8% by mass.

3. The method of claim 2 wherein the carbon content of the washed oxidatively regenerated catalyst is greater than 0.6% by mass.

4. The method of claim 1 wherein the liquid used to wash the oxidatively regenerated catalyst is acidic water.

5. The method of claim 4 wherein the liquid comprises at least 90% by mass water.

6. The method of claim 1 wherein the step of reacting the coke-contaminated catalyst with an oxidant is conducted at a temperature of at least 550° C. but less than 690° C.

7. The method of claim 1 wherein at least a portion of the oxidatively regenerated catalyst is passed through one or more cyclones to separate the at least a portion of the oxidatively regenerated catalyst from ash prior to the washing step.

8. The method of claim 1 wherein, prior to the step of reacting the coke-contaminated catalyst with an oxidant, the coke-contaminated catalyst is exposed to a gas stream comprising steam.

9. The method of claim 1 wherein, the oxidant comprises a mixture of oxygen and steam.

10. The method of claim 1 wherein the oxidant comprises oxygen and wherein the step of reacting the coke-contaminated catalyst with an oxidant is conducted in a combustion zone and wherein the oxidatively regenerated catalyst exits the combustion zone at a location that is lower with respect to gravity than the position at which the coke-contaminated catalyst enters the combustion zone, wherein the oxidant enters a bottom of the combustion zone and reacts with the coke on the coke-contaminated catalyst to produce a flue gas, and wherein the flue gas exits as an overhead from the combustion zone.

11. The method of claim 1 wherein at least a portion of the oxidatively regenerated catalyst is separated from ash before being subjected to the washing step.

12. The method of claim 1 wherein the reactor is a fluidized bed reactor and wherein a carbon content of the washed oxidatively regenerated catalyst is 0.1% to 1.8% by mass.

13. The method of claim 1 wherein the step of pyrolyzing the biomass is conducted at a temperature of 500° C. to 700° C., and wherein a carbon content of the washed oxidatively-regenerated catalyst is 0.3% to 1.0% by mass.

14. The method of claim 1 wherein the oxidatively regenerated catalyst has a potassium content of at least 2% by mass or.

15. The method of claim 1 further comprising a calcination step after the step of washing; and wherein the step of washing followed by the calcination step regenerates the number of Brønsted acid sites to at least 100% of the number of Brønsted acid sites present in the catalyst prior to said pyrolyzing.

16. The method of claim 1 further comprising a calcination step after the step of washing; and wherein the step of washing followed by the calcination step regenerates the number of Brønsted acid sites in the catalyst to a value of from 70% to 170% of the number of Brønsted acid sites present in the catalyst prior to said pyrolyzing.

17. The method of claim 1 wherein the washed oxidatively regenerated catalyst has at least 20% less potassium by mass than does the oxidatively regenerated catalyst prior to the washing step.

18. A method of converting biomass to hydrocarbon products, comprising:
feeding biomass into a reactor;
pyrolyzing the biomass in the reactor in the presence of a zeolite catalyst to produce hydrocarbon products, wherein the pyrolysis results in a coke-contaminated catalyst comprising at least 0.59% coke by mass;
removing the coke-contaminated catalyst from the reactor;
reacting the coke-contaminated catalyst with an oxidant to produce an oxidatively regenerated catalyst;
washing 1% to 50% by mass of the oxidatively regenerated catalyst with a liquid, wherein the washing regenerates Brønsted acid sites and produces a washed oxidatively regenerated catalyst;
separating the washed oxidatively regenerated catalyst from the liquid;
treating the separated washed oxidatively regenerated catalyst with a solution that adds at least one metal to the separated washed oxidatively regenerated catalyst to produce a treated separated washed oxidatively regenerated catalyst, wherein the at least one added metal is selected from the group consisting of Ga, Zn, Co, Fe, Cr, Cu, V, Ni, Mn, Ag, Na, P, Sn, Zr, Nb, Y, Ti, Ce, La, and combinations thereof; and
returning at least a portion of the treated separated washed oxidatively regenerated catalyst to the reactor.

19. A method of converting biomass to hydrocarbon products, comprising:
performing 2 to 500 pyrolysis and oxidative regeneration cycles wherein, each pyrolysis and oxidative regeneration cycle comprises:
(i) feeding biomass into a reactor;
(ii) pyrolyzing the biomass in the reactor in the presence of a catalyst comprising Brønsted acid sites to produce hydrocarbon products, wherein the pyrolysis results in a coke-contaminated catalyst;
(iii) oxidatively regenerating the coke-contaminated catalyst by reacting the coke contaminated catalyst with an oxidant to produce an oxidatively-regenerated catalyst; and
(iv) returning the oxidatively-regenerated catalyst to the reactor;
washing 1% to 50% by mass of the oxidatively-regenerated catalyst with a liquid after performing said 2 to 500 pyrolysis and oxidative regeneration cycles, wherein the washing regenerates Brønsted acid sites;
separating the washed oxidatively-regenerated catalyst from the liquid; and
returning at least a portion of the separated washed oxidatively-regenerated catalyst to the reactor.

20. A method of converting biomass to hydrocarbon products, comprising:
feeding biomass into a reactor;
pyrolyzing the biomass in the reactor in the presence of a zeolite catalyst to produce hydrocarbon products, wherein the zeolite catalyst comprises Brønsted acid sites and wherein the pyrolysis results in a coke-contaminated catalyst;
removing the coke-contaminated catalyst from the reactor;
reacting the coke-contaminated catalyst with an oxidant to produce an oxidatively regenerated catalyst;
washing 1% to 50% by mass of the oxidatively regenerated catalyst with a liquid to produce a washed oxidatively regenerated catalyst;
separating the washed oxidatively regenerated catalyst from the liquid;
calcining the washed oxidatively regenerated catalyst to produce a calcined washed oxidatively regenerated catalyst; and
returning at least a portion of the calcined washed oxidatively regenerated catalyst to the reactor;
wherein the number of Brønsted acid sites in the calcined washed oxidatively regenerated catalyst is at least 120% of the number of acid sites present in the zeolite catalyst prior to said pyrolyzing.

\* \* \* \* \*